(12) United States Patent
Boyce et al.

(10) Patent No.: US 11,002,649 B1
(45) Date of Patent: May 11, 2021

(54) APPARATUS FOR HIGH-THROUGHPUT SEQUENTIAL TENSILE TESTING AND METHODS THEREOF

(71) Applicant: National Technology & Engineering Solutions of Sandia, LLC, Albuquerque, NM (US)

(72) Inventors: Brad Boyce, Albuquerque, NM (US); Bradley Salzbrenner, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 211 days.

(21) Appl. No.: 16/506,779

(22) Filed: Jul. 9, 2019

Related U.S. Application Data

(60) Provisional application No. 62/695,996, filed on Jul. 10, 2018.

(51) Int. Cl.
  *G01N 3/08* (2006.01)
  *G01N 3/02* (2006.01)
  *B33Y 80/00* (2015.01)

(52) U.S. Cl.
  CPC .......... *G01N 3/08* (2013.01); *G01N 3/02* (2013.01); *B33Y 80/00* (2014.12); *G01N 2203/0017* (2013.01); *G01N 2203/0071* (2013.01); *G01N 2203/0073* (2013.01); *G01N 2203/0075* (2013.01); *G01N 2203/0206* (2013.01); *G01N 2203/0278* (2013.01); *G01N 2203/0282* (2013.01); *G01N 2203/0447* (2013.01)

(58) Field of Classification Search
  CPC .... G01N 3/08; G01N 3/02; G01N 2203/0073; G01N 2203/0075; G01N 2203/0071; G01N 2203/0017; G01N 2203/0206; G01N 2203/0447; G01N 2203/0282; G01N 2203/0278; B33Y 80/00
  See application file for complete search history.

(56) References Cited

U.S. PATENT DOCUMENTS

| | | | |
|---|---|---|---|
| 4,606,230 A * | 8/1986 | Scott | G01N 3/02 73/826 |
| 4,944,817 A | 7/1990 | Bourell et al. | |
| 5,437,192 A * | 8/1995 | Kawamoto | G01N 33/346 73/159 |
| 6,612,189 B1 * | 9/2003 | Miyauchi | G01N 3/08 73/829 |
| 9,651,464 B1 | 5/2017 | Salzbrenner et al. | |

OTHER PUBLICATIONS

U.S. Appl. No. 15/924,572, filed Mar. 19, 2018, Wild et al.
U.S. Appl. No. 15/968,618, filed May 1, 2018, Argibay et al.
U.S. Appl. No. 16/167,759, filed Oct. 23, 2018, Burchard et al.
U.S. Appl. No. 16/358,335, filed Mar. 19, 2019, Boyce et al.

(Continued)

*Primary Examiner* — Jonathan M Dunlap
(74) *Attorney, Agent, or Firm* — Helen S. Baca

(57) ABSTRACT

The present invention relates, in part, to an apparatus configured to test a plurality of test samples within a sample cartridge. Such an apparatus can facilitate high-throughput tensile testing of such test samples. Also described herein are methods for using such an apparatus and for testing such test samples.

20 Claims, 18 Drawing Sheets

(56) References Cited

OTHER PUBLICATIONS

ASTM E112-96, "Standard test methods for determining average grain size," ASTM International (West Conshohocken, PA), 2004, 26 pp.

ASTM E8 / E8M-16a, "Standard test methods for tension testing of metallic materials," ASTM International (West Conshohocken, PA), 2016, 30 pp.

Bertoli US et al., "On the limitations of volumetric energy density as a design parameter for selective laser melting," *Mater. Design* 2017;113:331-340.

Beuth J et al., Process mapping for qualification across multiple direct metal additive manufacturing processes, *Solid Freeform Fab. Proc.*, University of Texas at Austin (Austin, TX), 2013, pp. 655-665.

Bourell DL et al., "Roadmap for additive manufacturing: identifying the future of freeform processing," University of Texas at Austin (Austin, TX), 2009, 92 pp.

Boyce BL et al., "Extreme-value statistics reveal rare failure-critical defects in additive manufacturing," *Adv. Eng. Mater.* 2017;19(8):1700102 (10 pp.).

Boyce BL et al., "High-throughput testing reveals rare, catastrophic defects," Sandia Report No. SAND2017-9603C, Sep. 2017, 29 pp.

Boyce BL et al., "High-throughput testing reveals rare, catastrophic defects," Sandia Report No. SAND2017-9618C, Sep. 2017, 30 pp.

Boyce BL et al., "Progress towards autonomous experimental systems for alloy development," *MRS Bull.* 2019;44:273-280.

Boyce BL et al., "Rapid, high-throughput mechanical evaluation of additively manufactured metals," Sandia Report No. SAND2016-1499C, Feb. 2016, 19 pp.

Brown CU et al., "Interlaboratory study for nickel alloy 625 made by laser powder bed fusion to quantify mechanical property variability," *J. Mater. Eng. Perform.* 2016;25(8):3390-3397.

Carroll J et al., "Ductile mechanics laboratory capabilities," Sandia Report No. SAND2018-3407PE, Mar. 2018, 12 pp.

Carroll JD et al., "Mechanical properties of AM metals," Sandia Report No. SAND2018-2339C, Mar. 2018, 23 pp.

Cherry JA et al., "Investigation into the effect of process parameters on microstructural and physical properties of 316L stainless steel parts by selective laser melting," *Int. J. Adv. Manuf. Technol.* 2015;76(5-8):869-879.

Clymer DR et al., "Power-velocity process design charts for powder bed additive manufacturing," *J. Mech. Design* 2017;139(10):100907 (7 pp.).

Du Plessis A et al., "Application of microCT to the non-destructive testing of an additive manufactured titanium component," *Case Studies Nondestruct. Test. Eval.* 2015;4:1-7.

Elmer JW et al., "The effect of reduced pressure on laser keyhole weld porosity and weld geometry in commercially pure titanium and nickel," *Weld. J.* 2016;95;419-430.

Finfrock CB et al., "Effect of hot isostatic pressing and powder feedstock on porosity, microstructure, and mechanical properties of selective laser melted AlSi10Mg," *Metallogr. Microstruct. Anal.* 2018;7(4):443-456.

Foster SJ et al., "Process-detect-structure-property correlations during laser powder bed fuston of alloy 718: role of in situ and ex situ characterizations," *Metallurg. Mater. Trans. A* 2018;49(11):5775-5798.

Frazier WE, "Direct digital manufacturing of metallic components: vision and roadmap," *Solid Freeform Fab. Proc.*, University of Texas at Austin (Austin, TX), 2010, pp. 717-732.

Gorsse S et al., "Additive manufacturing of metals: a brief review of the characteristic microstructures and properties of steels, Ti—6Al—4V and high-entropy alloys," *Sci. Technol. Adv. Mater.* 2017;18(1):584-610.

Irrinki H et al., "Effects of powder attributes and laser powder bed fusion (L-PBF) process conditions on the densification and mechanical properties of 17-4 PH stainless steel," *JOM* 2016;68(3):860-868.

Ishwaran H, "Identifiability and rates of estimation for scale parameters in location mixture models," *Ann. Statist.* 1996;24(4):1560-1571.

ISO/ASTM52900-15, "Standard terminology for additive manufacturing-general principles—terminology," ASTM International (West Conshohocken, PA), 2015, 9 pp.

Jared BH et al., "Additive manufacturing: toward holistic design," *Scripta Mater.* 2017;135:141-147.

Kamath C et al., "Density of additively-manufactured, 316L SS parts using laser powder-bed fusion at powers up to 400 W," *Int. J. Adv. Manul. Technol.* 2014;74(1-4):65-78.

Khairallah SA et al., "Laser powder-bed fusion additive manufacturing: physics of complex melt flow and formation mechanisms of pores, spatter, and denudation zones," *Acta Mater.* 2016;108:36-45.

Kim FH et al., "Literature review of metal additive manufacturing defects," *NIST Advanced Manufacturing Series (NIST AMS)* No. 100-16, 2018, 17 pp.

Lewandowski JJ et al., "Metal additive manufacturing: a review of mechanical properties," *Annu. Rev. Mater. Res.* 2016;46:151-186.

Lu F et al., "Formation and influence mechanism of keyhole-induced porosity in deep-penetration laser welding based on 3D transient modeling," *Int. J. Heat Mass Transfer* 2015;90:1143-1152.

Madison JD et al., "Advancing quantitative description of porosity in autogenous laser-welds of 304L stainless steel," *Integr. Mater. Manuf. Innov.* 2014;3(1):141-157.

Madison JD et al., "Corroborating tomographic defect metrics with mechanical response in an additively manufactured precipitation-hardened stainless steel," *AIP Conf. Proc.* 2018;1949(1):020009 (8 pp.).

Madison JD et al., "Quantitative characterization of porosity in laser welds of stainless steel," *Scripta Mater.* 2012;67(9):783-786.

Mercells P et al., "Residual stresses in selective laser sintering and selective laser melting," *Rapid Prototyp. J.* 2006;12(5):254-265.

Miranda G et al., "Predictive models for physical and mechanical properties of 316L stainless steel produced by selective laser melting," *Mater. Sci. Eng. A* 2016:657:43-56.

Norris JT et al., "Effects of laser parameters on porosity formation: investigating millimeter scale continuous wave Nd:YAG laser welds," *Weld. J.* 2011;90(10):198s-203s.

Pang S et al., "3D transient multiphase model for keyhole, vapor plume, and weld pool dynamics in laser welding including the ambient pressure effect," *Opt. Lasers Eng.* 2015;74:47-58.

Qiu C et al., "On the role of melt flow into the surface structure and porosity development during selective laser melting," *Acta Mater.* 2015;96:72-79.

Roach RA et al., "Born Qualified Grand Challenge LDRD final report," Sandia Report No. SAND2018-11276, Sep. 2018, 105 pp.

Salzbrenner BC et al., "High-throughput stochastic tensile performance of additively manufactured stainless steel," *J. Mater. Process. Technol.* 2017;241:1-12.

Salzbrenner BC, "High-throughput tensile testing reveals stochastic properties in additively manufactured steel," *M.S. thesis dissertation*, Department of Mechnical Engineering, University of New Mexico (Albuquerque, NM), May 2017, 81 pp.

Sames WJ et al., "The metallurgy and processing science of metal additive manufacturing," *Int. Mater. Rev.* 2016;61(5):315-360.

Seifi M et al., Overview of materials qualification needs for metal additive manufacturing, *JOM* 2016;68(3):747-764.

Semak V et al., "The role of recoil pressure in energy balance during laser materials processing," *J. Phys. D Appl. Phys.* 1997;30(18):2541-2552.

Singh KK et al., "Hall-Petch behaviour of 316L austenitic stainless steel at room temperature," *Mater. Sci. Technol.* 2002;18(2):165-172.

Spierings AB et al., "Influence of the particle size distribution on surface quality and mechanical properties in AM steel parts," *Rapid Prototyp. J.* 2011;17(3):195-202.

Sun Z et al., "Selective laser melting of stainless steel 316L with low porosity and high build rates," *Mater. Design* 2016;104:197-204.

Sutton AT et al., "Powder characterisation techniques and effects of powder characteristics on part properties in powder-bed fusion processes," *Virtual Phys. Prototyping* 2017;12(1):3-29.

(56) References Cited

OTHER PUBLICATIONS

Tapia G et al., "Prediction of porosity in metal-based additive manufacturing using spatial Gaussian process models," *Additive Manuf.* 2016;12(B):282-290.
Tolosa I et al., "Study of mechanical properties of AISI 316 stainless steel processed by "selective laser melting", following different manufacturing strategies," *Int. J. Adv. Manuf. Technol.* 2010;51(5-8):639-647.
Wu AS et al., "An experimental investigation into additive manufacturing-induced residual stresses in 316L stainless steel," *Metallurg. Mater. Trans. A* 2014;45(13):6260-6270.
Yadollahi A et al., "Additive manufacturing of fatigue resistant materials: challenges and opportunities," *Int. J. Fatigue* 2017;98:14-31.
Yang Y et al., "Sample sizes based on Weibull distribution and normal distribution for FRP tensile coupon test," *Materials* 2019;12(1):126 (10 pp.).

\* cited by examiner

APPARATUS FOR HIGH-THROUGHPUT SEQUENTIAL TENSILE TESTING AND METHODS THEREOF

CROSS-REFERENCE TO RELATED APPLICATION

This application claims the benefit of U.S. Provisional Application No. 62/695,996, filed Jul. 10, 2018, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates, in part, to an apparatus configured to test a plurality of test samples within a sample cartridge. Such an apparatus can facilitate high-throughput tensile testing of such test samples. Also described herein are methods for using such an apparatus and for testing such test samples.

BACKGROUND OF THE INVENTION

Additive manufacturing allows for rapid production of structural components. Yet, also desired are complementary testing of such components on a high throughput basis. Such testing can provide details on process variability, structural defects, and material characteristics. Accordingly, further systems capable of such testing are desired.

SUMMARY OF THE INVENTION

The present invention relates, in part, to an apparatus suitable for measuring tensile properties of multiple test samples in rapid succession. The tensile samples are provided as a cartridge, which allows each test to occur independently and in sequential order, rather than in parallel. In one non-limiting instance, the testing apparatus and method allow for determination of one or more mechanical properties, such as elastic modulus, yield strength, ultimate tensile strength, creep, strain-rate sensitivity, fracture toughness, and fatigue life. In one embodiment, the cartridge can be provided as a plurality of connected tensile samples, which can be produced by additive manufacturing or deposition processes. In another embodiment, the cartridge includes a carrier and a plurality of tensile samples that can be individually loaded into the carrier.

In a first aspect, the present invention features an apparatus including: a sample cartridge including a first test sample having a free end and an attached end; a cartridge holder configured to house the attached end of the first test sample; a grip assembly configured to grasp the free end of the first test sample; and a stage assembly configured to move the cartridge holder to a first position (e.g., wherein the first position provides the free end of the first test sample in proximity to the grip assembly).

In some embodiments, the sample cartridge includes a first test sample and a second test sample. In other embodiments, the cartridge holder is further configured to house the attached end of the first and second test samples; and the grip assembly is configured to grasp the free end of the first or second test samples. In yet other embodiments, the stage assembly is further configured to move the cartridge holder to a second position, wherein the first position provides the free end of the first test sample in proximity to the grip assembly and wherein the second position provides the free end of the second test sample in proximity to the grip assembly.

In some embodiments, the sample cartridge includes a base connected to a test sample (e.g., each of the first and/or second test samples). In other embodiments, the base and at least one test sample (e.g., the first and/or second test samples) includes a monolithic, single structure.

In some embodiments, the sample cartridge includes a plurality of test samples, and wherein each test sample includes a free end and an attached end.

In some embodiments, the grip assembly includes a first jaw portion, a second jaw portion, and a recessed portion disposed between the first and second jaw portions, wherein the recessed portion is configured to adapt to the free end of a test sample (e.g., the first and/or second test samples).

In some embodiments, the stage assembly is configured to translate horizontally from a first position to a second position. In other embodiments, the stage assembly is configured to translate vertically to apply a tensile stress between the free end and the attached end of a test sample (e.g., the first and/or second test samples). In yet other embodiments, the stage assembly is configured to translate vertically to release the tensile stress applied to the first test sample, to translate horizontally to adapt to the free end of the second test sample, and to translate vertically to release the tensile stress applied to the second test sample.

In some embodiments, the sample cartridge includes a carrier configured to house the attached end of a plurality of test samples (e.g., the first and second test samples).

In a second aspect, the present invention features an apparatus including: a sample cartridge including a plurality of test samples, wherein each test sample has a free end and an attached end; a cartridge holder configured to house the attached end of each of the plurality of test samples; a grip assembly configured to grasp the free end of at least one test sample; and a stage assembly configured to move the cartridge holder to a plurality of positions, wherein each position provides the free end of at least one test sample in proximity to the grip assembly. In some embodiments, the cartridge holder includes a carrier including a plurality of slots, where each slot is configured to house one test sample.

In a third aspect, the present invention features a method of measuring a characteristic of a plurality of test samples. In some embodiments, the method includes: i. providing a sample cartridge disposed on a stage assembly, wherein the sample cartridge includes a first test sample and second test sample, wherein each test sample includes a free end and an attached end; ii. positioning a recessed portion of a grip assembly in proximity to the free end of the first test sample, wherein the grip assembly includes a first jaw portion, a second jaw portion, and the recessed portion disposed between the first and second jaw portions; iii. moving (e.g., in a vertical direction) the stage assembly to a first position (e.g., a first vertical position) to apply a tensile stress to a reduced portion of the first test sample; iv. imaging the reduced portion of the first test sample; v. moving (e.g., in a vertical direction) the stage assembly to a second position (e.g., a second vertical position) to release the applied tensile stress to the first test sample; vi. moving (e.g., in a horizontal direction) the stage assembly to a third position (e.g., a first horizontal position) that provides the free end of the second test sample in proximity to the recessed portion of the grip assembly; and vii. moving (e.g., in a vertical direction) the stage assembly to a fourth position (e.g., a third vertical position) to apply a tensile stress to a portion of the second test sample.

In a fourth aspect, the present invention features a method of measuring a characteristic of a plurality of test samples disposed in a sample cartridge. In some embodiments, the method includes: i. providing a sample cartridge disposed on a stage assembly, wherein the sample cartridge includes a plurality of test samples and each test sample includes a free end and an attached end; ii. positioning a recessed portion of a grip assembly in proximity to the free end of at least one test sample, wherein the grip assembly includes a first jaw portion, a second jaw portion, and the recessed portion disposed between the first and second jaw portions; iii. moving (e.g., in a vertical direction) the stage assembly to a first position to apply a tensile stress to a reduced portion of at least one test sample; iv. imaging the reduced portion of the at least one test sample; v. moving (e.g., in a vertical direction) the stage assembly to a second position to release the applied tensile stress to the at least one test sample; vi. moving (e.g., in a horizontal direction) the stage assembly to a third position that provides a free end of another test sample in proximity to the recessed portion of the grip assembly; and vii. moving (e.g., in a vertical direction) the stage assembly to a fourth position to apply a tensile stress to a portion of the another test sample.

In some embodiments, the imaging step further includes analyzing one or more images to provide a stress measurement.

In other embodiments, the method further includes viii. imaging a reduced portion of a test sample (e.g., the second test sample or the another test sample).

In any embodiment herein, the apparatus can further include a camera configured to image a section disposed between the free end and the attached end of a test sample (e.g., a first test sample, a second test sample, etc.). In other embodiments, the camera is configured to image a first section disposed between the free end and the attached end of a first test sample at a first position. In yet other embodiments, the camera is further configured to image a second section disposed between the free end and the attached end of a second test sample at a second position.

In any embodiment herein, a test sample (e.g., a first and/or second test sample, or each and every test sample, or each of the plurality of test samples) includes an upper shoulder portion in proximity to the free end, a lower shoulder portion in proximity to the attached end, and a reduced section disposed between the upper and lower shoulder portions. In some embodiments, the upper shoulder portion and the lower shoulder portion includes a wedge having a 45° angle.

In any embodiment herein, a test sample (e.g., a first and/or second test sample, or each and every test sample, or each of the plurality of test samples) includes an attached end (e.g., configured to be housed within a cartridge holder) and a free end (e.g., configured to be grasped by a grip assembly). In some embodiments, the test sample includes a notch disposed at an attached end, wherein the notch is configured to adapt to an alignment feature of a cartridge holder.

In any embodiment herein, the apparatus can further include a grip assembly. In some embodiments, the grip assembly includes a first jaw portion, a second jaw portion, and a recessed portion disposed between the first and second jaw portions. In some embodiments, the recessed portion is configured to adapt to a free end of a test sample (e.g., a first and/or second test sample, or each and every test sample, or each of the plurality of test samples).

In any embodiment herein, the apparatus can further include a stage assembly. In some embodiments, the stage assembly is configured to translate horizontally from a first position (e.g., providing a first test sample in proximity to the grip assembly, such as a recessed portion of the grip assembly) to a second position (e.g., providing a second test sample in proximity to the grip assembly, such as a recessed portion of the grip assembly). In some embodiments, the stage assembly is configured to translate horizontally to a plurality of positions, wherein each position at least one test sample in proximity to the grip assembly, such as a recessed portion of the grip assembly. In other embodiments, the stage assembly is configured to translate vertically to apply a tensile stress between a free end and an attached end of a test sample (e.g., a first and/or second test sample, or each and every test sample, or each of the plurality of test samples). In yet other embodiments, the stage assembly is configured to translate vertically to apply a tensile stress between a free end and an attached end of a test sample at each of the plurality of positions. In some embodiments, the stage assembly is configured to translate vertically to release the tensile stress applied to a first test sample, to translate horizontally to adapt to the free end of a second test sample, and to translate vertically to release the tensile stress applied to the second test sample.

In any embodiment herein, the apparatus can further include a processor coupled to the stage assembly, wherein the processor is configured to generate a horizontal control signal and/or a vertical control signal to move the stage assembly.

In any embodiment herein, the apparatus can further include a processor coupled to a camera. In some embodiments, the processor is configured to receive one or more electronic detection signals from the camera, and the processor is configured to generate a stress measurement based on the one or more detection signals.

In any embodiment herein, the stress measurement is provided in real time.

Definitions

As used herein, the term "about" means+/−10% of any recited value. As used herein, this term modifies any recited value, range of values, or endpoints of one or more ranges.

By "micro" is meant having at least one dimension that is less than 1 mm and, optionally, equal to or larger than about 1 µm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 µm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 µm but equal to or larger than 1 nm. In other instances, the nanostructure has a dimension that is of from about 1 nm to about 1 µm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates, in part, to an apparatus configured for high throughput testing of a plurality of test samples. In particular embodiments, the test samples are provided within a cartridge. Any useful testing measurements can be obtained, such as stress measurements, e.g., tension measurement, compression measurements, fatigue testing, elastic modulus, yield strength, ultimate tensile strength, creep, strain-rate sensitivity, fracture toughness, strain at failure, unloading modulus, and fatigue life; or material characteristics, such as ductility, surface porosity, voids, microstructures, thermal diffusivity, thermal conductivity, elemental distribution, etc.

The apparatus can include any useful components to facilitate tensile measurements of a test sample. In one non-limiting embodiment, the apparatus includes a sample cartridge, a grip assembly, a cartridge holder, and a stage (e.g., any described herein).

Figure 1A:
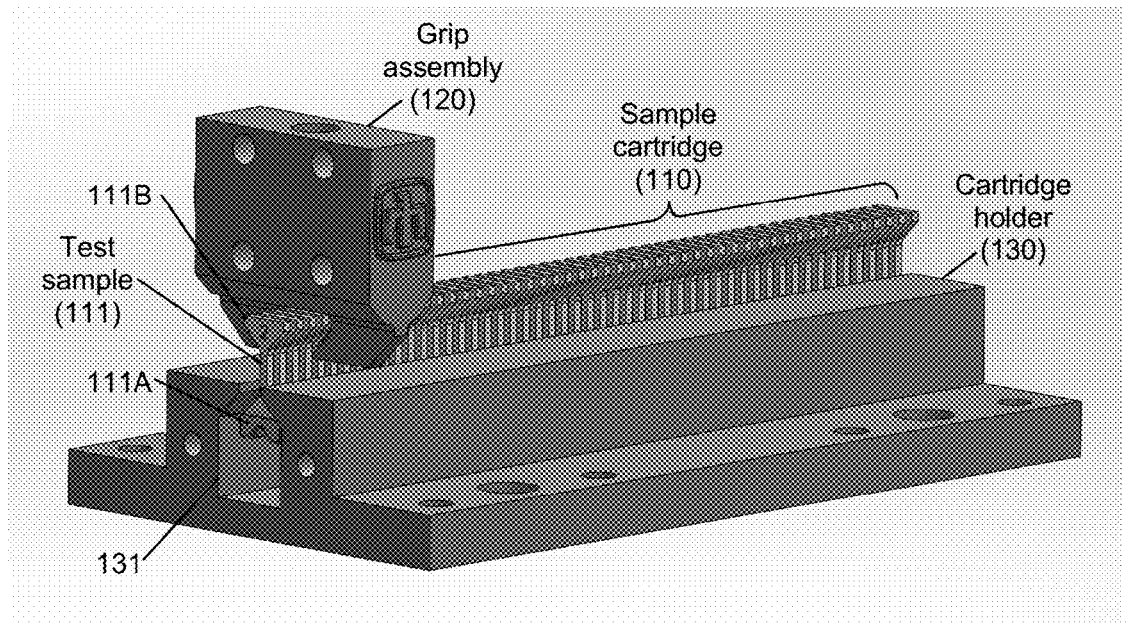
FIG. 1A-1D shows non-limiting embodiments of an apparatus having a sample cartridge. Provided are drawings of an exemplary grip assembly 120 for use with a cartridge holder 130 (FIG. 1A), as well as an exemplary apparatus (FIG. 1B) after moving to a first vertical position (FIG. 1C) and then to a second horizontal translation (FIG. 1D).

FIG. 1A provides exemplary components including a sample cartridge 110 including plurality of test samples 111, a grip assembly 120, and a cartridge holder 130. As can be seen, the test sample 111 can include a top portion (a free end) and a bottom portion (an attached end). The free end is configured to be accessible to the grip assembly 120, and the attached end is configured to be housed within the cartridge holder 130.

The cartridge holder can have any useful structure to allow for housing of at least one end of a test sample. In some embodiments, the cartridge holder is configured to house each attached end of each test sample, such that the free end of each test sample is accessible to the grip assembly. In some embodiments, the test sample can include an alignment feature that facilitates loading of the test sample into a cavity of the cartridge holder. As seen in FIG. 1A, the cartridge holder 130 can include a cavity 131 that extends along a longitudinal axis of the holder. The cavity 131 permits housing of an attached end 111A of the test sample and yet allows the free end 111B of the test sample to be accessed by the grip assembly 120. In one embodiment, the grip assembly moves along a longitudinal direction in order to access a free end of a test sample within the sample cartridge. In another embodiment, the grip assembly is stationary, but the cartridge holder is moved along a longitudinal direction (e.g., by a stage assembly) in order to provide a free end of a test sample in proximity to the grip assembly.

Figures 1B, 1C:
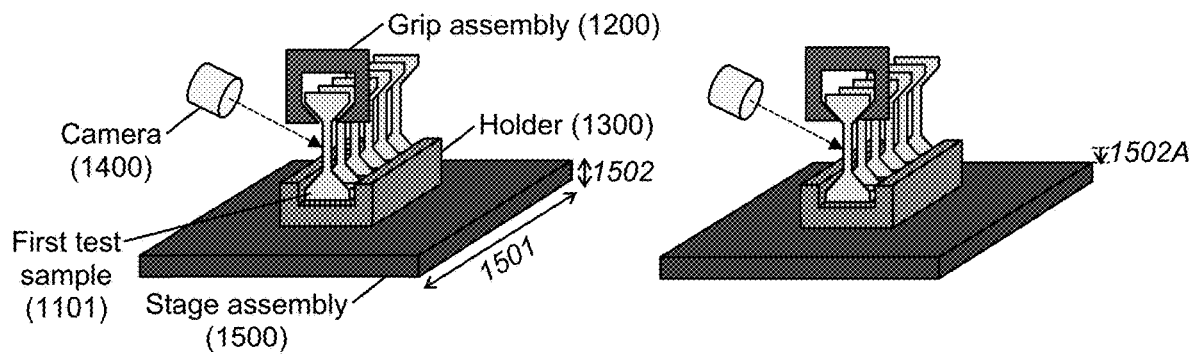

FIG. 1B provides an exemplary apparatus in use. As can be seen, the apparatus can include a sample cartridge including a plurality of test samples, including a first test sample 1101; a grip assembly 1200; a cartridge holder 1300; and a stage assembly 1500. The grip assembly 1200 is configured to grasp a free end of at least one test sample. The stage assembly 1500 is configured to provide to move in a horizontal direction 1501 and a vertical direction 1502. The apparatus further includes a camera 1400 that is configured to image a portion of the first test sample 1101.

Tensile testing generally requires an applied tension to the test sample in any useful manner. In one non-limiting instance, one end of the test sample is maintained at a stationary position, and the other end of the test sample is extended in one direction. As seen in FIG. 1C, in one non-limiting embodiment, applied tension arises from moving the stage assembly in a vertical direction 1502A away from the stationary grip assembly 1200. As tension is applied, a camera can image the reduced portion of the test sample to monitor changes in structural features, which in turn can provide real-time non-contact stress measurements (e.g., by way of digital image correlation using algorithmic analysis).

Figure 1D:
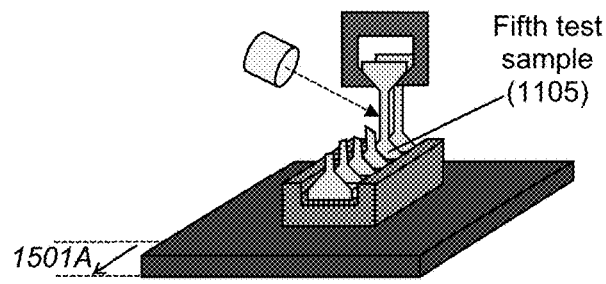

Numerous test samples can be tested in a high throughput manner. In one embodiment, the sample cartridge includes a plurality of test samples, and each end of each test sample can be tested in a sequential order. For instance, the apparatus can include a stage assembly configured to move the sample cartridge and stop when at least one test sample is in proximity to the grip assembly. As seen in FIG. 1D, in one non-limiting embodiment, the stage assembly moves in a horizontal direction 1501A to provide the fifth test sample 1105 in proximity to the grip assembly 1200.

The stage assembly can be programmed to provide a combination of vertical and horizontal movements to facilitate high throughput measurements. In one non-limiting instance, the grip assembly and camera are stationary, and the stage assembly is employed to move the test sample (within the sample cartridge) to useful locations. A vertical movement can be used to apply tension to a test sample (e.g., a vertical movement of the sample cartridge away from a stationary grip assembly) or to relieve applied tension to the test sample (e.g., a vertical movement of the sample cartridge towards the stationary grip assembly). A horizontal movement can be used to move from one test sample to the next test sample within the sample cartridge. Any useful combination of movements can be employed.

Test Samples and Sample Cartridges

Figure 2A:
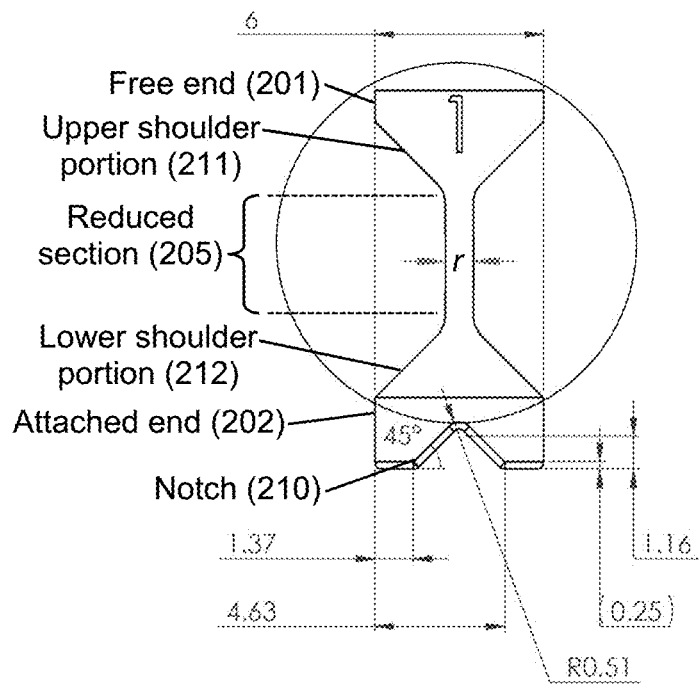
FIG. 2A-2E shows exemplary test samples and sample cartridges. Provided are schematics of front views of an exemplary test sample (FIG. 2A-2B), as well as a side view (FIG. 2C) and a perspective view (FIG. 2D) of an exemplary sample cartridge 2000. Also provided is a photograph of an exemplary sample cartridge (FIG. 2E). All measurements are in mm unless otherwise specified.
Figure 2B:
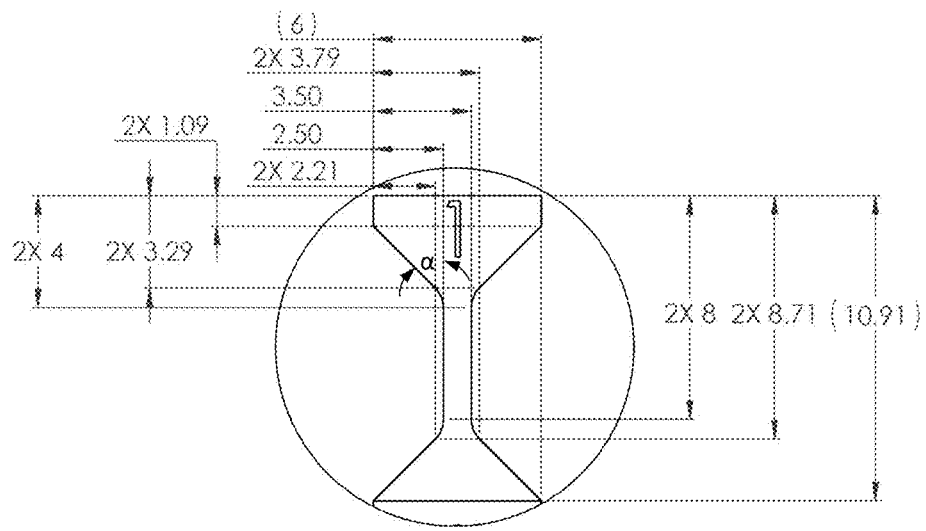

The present invention includes methods and apparatuses to test one or more test samples. In some embodiments, a plurality of test samples is provided within a sample cartridge. FIG. 2A-2B provides an exemplary test sample having a modified dog bone geometry. As can be seen, the test sample includes a free end 201 (e.g., configured to be grasped by a grip assembly), an attached end 202 (e.g., configured to be housed within a cartridge holder), and a reduced section 205 disposed between the two ends. Upon applying a force between the two ends, fractures generally form within the reduced section.

To facilitate manufacturing (e.g., by additive manufacturing methods), the geometry or topology of the test sample can be optimized to reduce overhangs, minimize large bores, and/or avoid thick layers. In one non-limiting instance, the test sample includes an upper shoulder portion 211 disposed between the free end 201 and the reduced section 205, as well as a lower shoulder portion 212 disposed between the attached end 202 and the reduced section 205. In some embodiments, the upper shoulder portion and/or the lower shoulder portion includes a wedge having an angle $\alpha$ (e.g., an angle $\alpha$ of from about 30° to about 50°, including about 45°).

In one embodiment, the test sample includes an alignment feature. In one instance, the alignment feature is a notch 210 disposed at the attached end of the test sample. The notch can be employed to align the test sample within the cartridge holder. The notch can also be contacted with a sliding portion to insert an array of test samples into a cavity of the cartridge holder.

An array of test samples can be provided in any useful manner, e.g., such as in a sample cartridge. In one instance, the test samples are provided as a single structure that serves as the sample cartridge. Such a single, monolithic structure can be provided by employing a base structure connected to each test sample. Furthermore, arrays of test samples (e.g., tensile bars) can be used to investigate stochastic tensile properties. For instance, arrays of two different-sized test samples can allow for exploration of size-dependent mechanical properties. Accordingly, each array of test samples can include a subarray having a plurality of test samples, in which each subarray possesses a different characteristic (e.g., different material; different print parameter, such as power, scan speed, scan pattern, etc.; different manufacturer; different post-print process, such as annealing, chemical treatment, etc.).

Figure 2C:
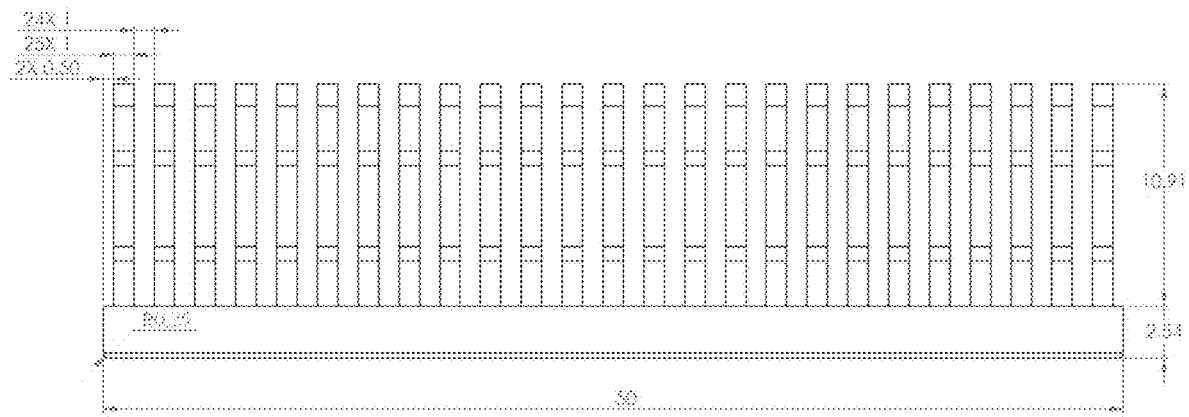
Figure 2D:
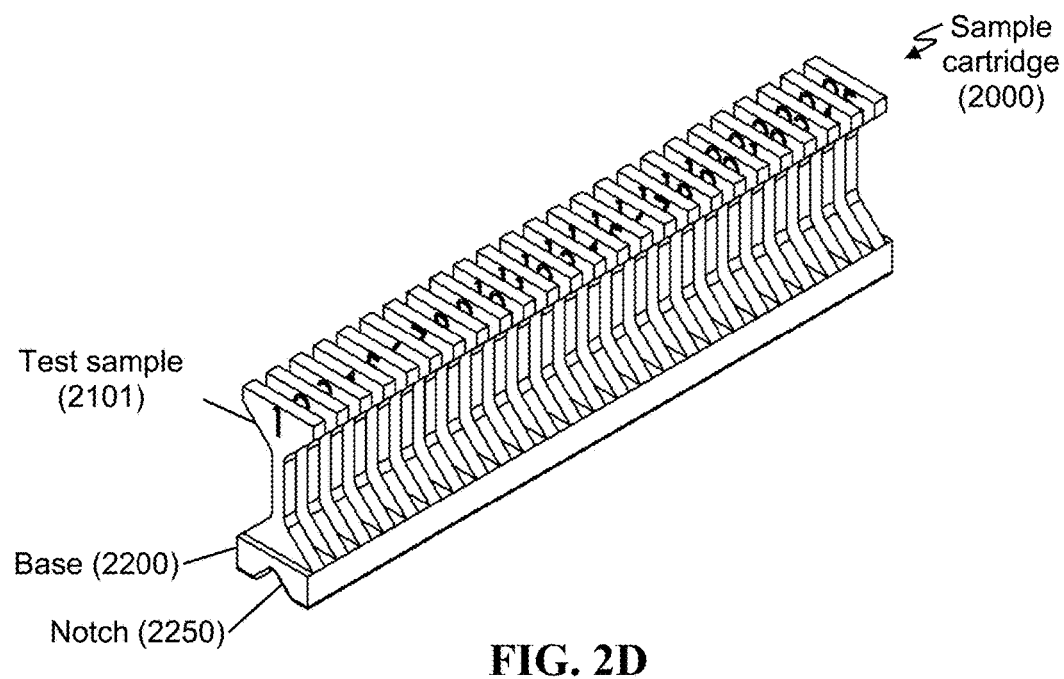
Figure 2E:
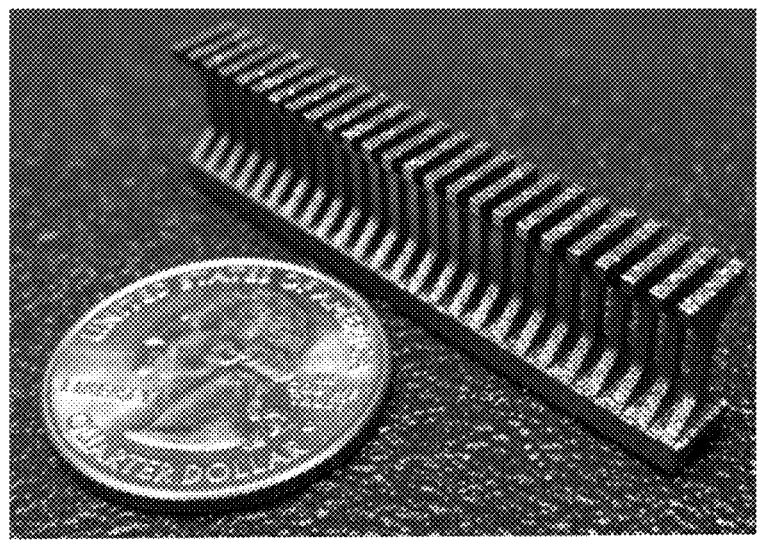

As seen in FIG. 2C-2D, provided is a side view of a sample cartridge 2000 including twenty-five test samples 2101, in which each test sample (e.g., the attached end of each test sample) is connected to a base 2200. The sample cartridge also includes a notch 2250 extending along a longitudinal direction of the cartridge and in proximity to each test sample. A sample cartridge can include any useful number of test samples, such as of from about 10 to about 100 test samples. FIG. 2E provides a photograph of a sample cartridge produced by additive manufacturing methods.

Figure 6:
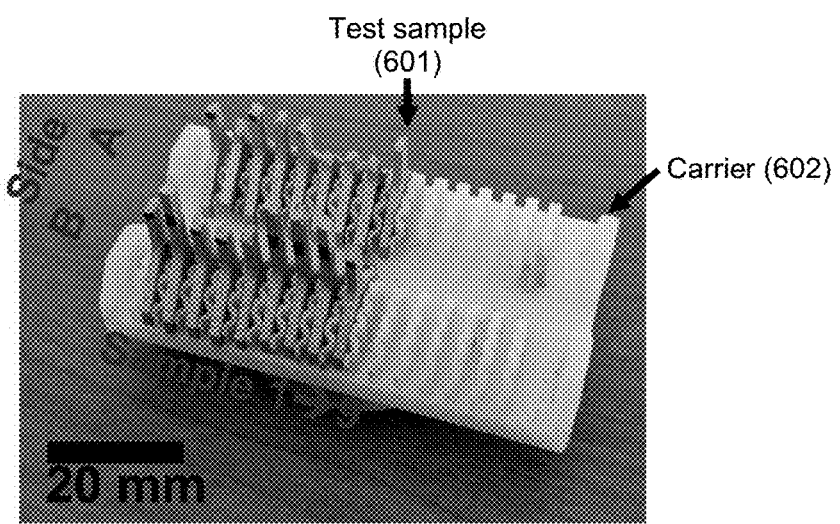
FIG. 6 shows an exemplary sample cartridge including a carrier 602 configured to house a test sample 601.

In another embodiment, an array of test samples is provided within a carrier. In one non-limiting instance, the carrier can include a plurality of slots, in which each slot is configured to house the attached end of a single test sample. In use, a test sample can be inserted into each slot, thereby providing a plurality of test samples in sequential order. FIG. 6 provides an exemplary sample cartridge including a carrier 602 and a plurality of test samples 601.

The test sample can be any useful geometry and/or cross-section, e.g., dog bone, rod, sheet, bar, strip, wire, tube, plate-type specimen, sheet-type specimen, pin-loaded tension test specimen, round tension test specimen, longitudinal tension test specimen, transverse tension test specimen, cylindrical, rectangular, shouldered, threaded, etc.; as well as of any useful material, e.g., metal, ceramic, a composite, etc. having any useful finish, polish, or other surface conditions (e.g., as cast, as forged, as machined, as rolled, etc.) or bulk conditions (e.g., annealed).

The sample cartridge can have any useful number and type of test samples. In one embodiment, each test sample possesses the same geometry and material. In another embodiment, at least two test samples within the sample cartridge are different (e.g., possess different geometries and/or different materials).

In one non-limiting instance, the test sample(s) and/or sample cartridge are produced by using additive manufacturing methods. Exemplary additive manufacturing methods include, e.g., laser sintering, powder bed fusion, direct metal laser sintering (DMLS), direct metal laser melting (DMLM), selective laser melting (SLM), selective laser sintering (SLS), stereolithography, rapid prototyping (RP), direct digital manufacturing (DDM), electron beam melting (EBM), direct metal deposition (DMD), laser engineered net shaping (LENS), etc. Such methods can be employed with any useful material, such as metal, ceramic, composites thereof, alloys thereof, etc., including powdered metal material (e.g., tool steel, stainless steel (e.g., 630, 420, 316, 304, etc.), nickel alloys, cobalt alloys, titanium alloys, etc.), cobalt chromium molybdenum (CoCrMo) alloy, stainless steel (e.g., a precipitation-hardened stainless steel alloy), an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L, 17-4PH or Alloy 630) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972. Materials may be further processed, e.g., by annealing, heating, aging, hot isostatic pressing, etc.

Grip Assembly

Figure 3:
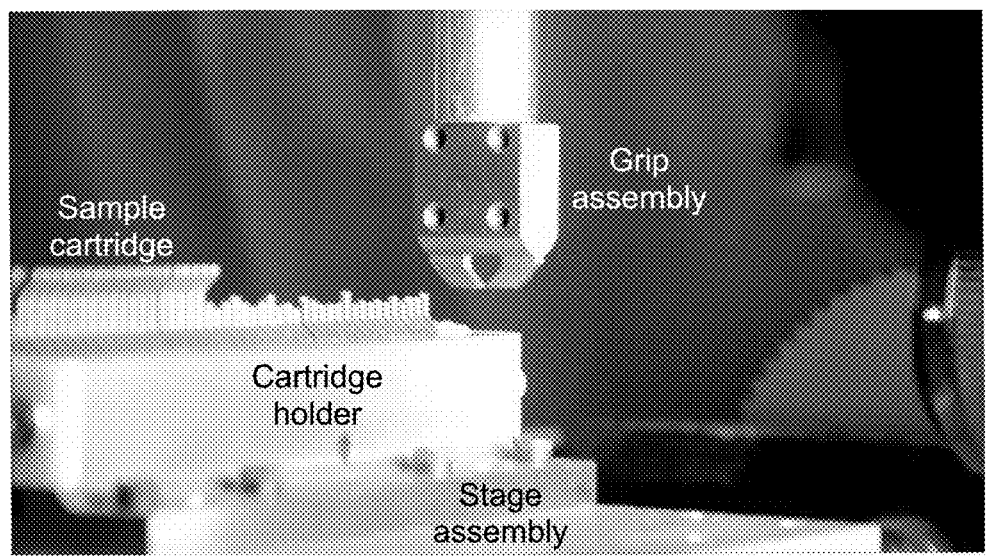
FIG. 3 shows a photograph of an exemplary apparatus including a sample cartridge, a cartridge holder configured to house the sample cartridge, a stage assembly configured to move the cartridge holder, and a grip assembly configured to grasp a free end of a test sample within the cartridge.

The present invention includes methods and apparatuses having a grip assembly to access each test sample. FIG. 3 provides a photograph of an exemplary apparatus including a grip assembly in proximity to a sample cartridge, which in turn is housed in a cartridge holder disposed in proximity to a stage assembly.

Figure 4A:
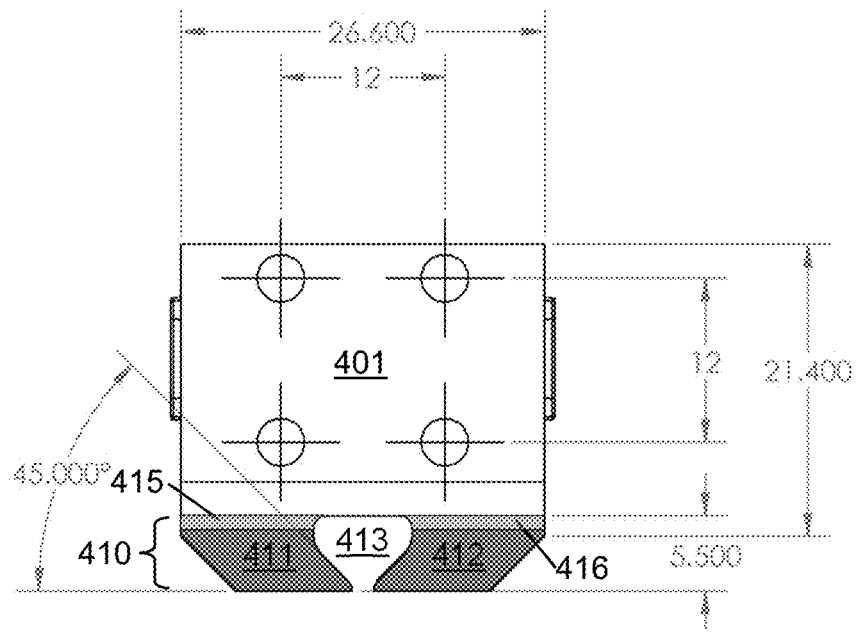
FIG. 4A-4C shows an exemplary grip assembly. Provided are schematics of a front plan view (FIG. 4A), end view (FIG. 4B), and perspective view (FIG. 4C) of an exemplary grip assembly 4000.
Figure 4B:
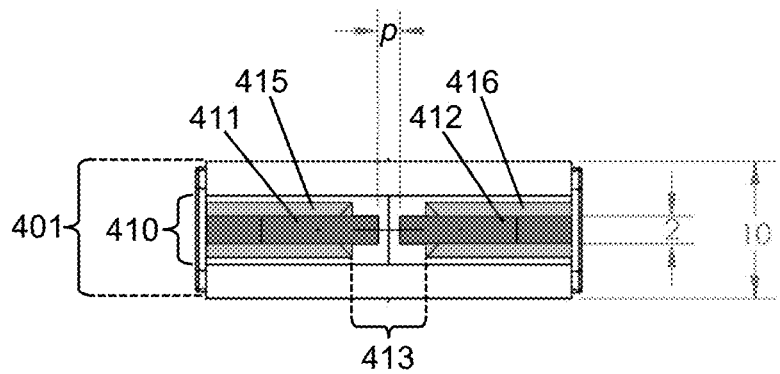

The grip assembly can have any useful components to facilitate gripping an attached end of at least one test sample. As seen in FIG. 4A-4B, an exemplary grip assembly can include a body 401 and a jaw 410 disposed on one end of the body. To accommodate a change in profile thickness of the body 401 and the jaw 410, tapered sections 415, 416 may be present.

The jaw 410, in turn, can include a first jaw portion 411, a second jaw portion 412, and a recessed portion 413 disposed between the first and second jaw portions. In particular, the recessed portion can be configured to adapt to the free end of a test sample. For instance, the geometry of the recessed portion can be configured to fit a free end and an upper shoulder portion of a test sample, while allowing the reduced section to remain clear of the grip assembly.

Figure 4C:
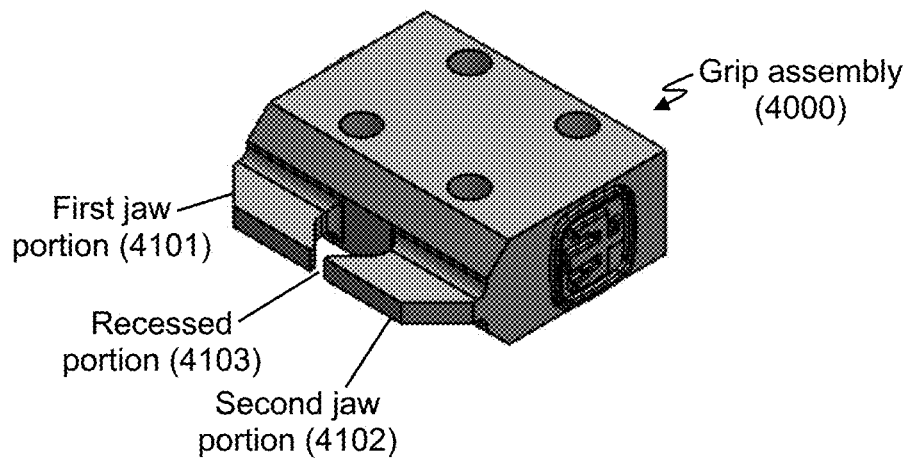

FIG. 4C shows a rendering of an exemplary grip assembly 4000 having a first jaw portion 4101, a second jaw portion 4102, and a recessed portion 4103.

In some embodiments, the grip assembly remains stationary and is configured to provide sufficient clearances to allow a test sample to be positioned within the recessed portion by using a movable stage assembly. For instance, the recessed portion can have a periphery in the shape of a pear curve, in which the narrow orifice at the base of the curve has a distance that is slightly greater than a width of the test sample. For instance, as seen in FIG. 4B, the narrow orifice of the recessed portion can have a distance p that is greater than a width r of the recessed portion of the test sample (see, e.g., FIG. 2A). In one non-limiting instance, p is about 1.2 to about 1.8 times greater than r (e.g., p is of from about 1.2 mm to about 1.8 mm, such as about 1.6 mm; and r is about 1 mm).

Stage Assembly

The present invention can include methods and apparatuses having a stage assembly (e.g., a movable stage assembly) to facilitate access of each test sample by the grip assembly (e.g., any described herein). The stage assembly can be configured to move in any useful direction(s). In one embodiment, the stage assembly is configured to translate from a first position (e.g., to provide a first test sample in proximity to a grip assembly) to a second position (e.g., to provide a second test sample in proximity to a grip assembly); to apply a tensile stress to a test sample (e.g., by moving in a vertical direction away from a grip assembly); and/or to relieve an applied tensile stress to a test sample (e.g., by moving in a vertical direction toward from a grip assembly), in any useful order and for any useful duration.

Figure 5:
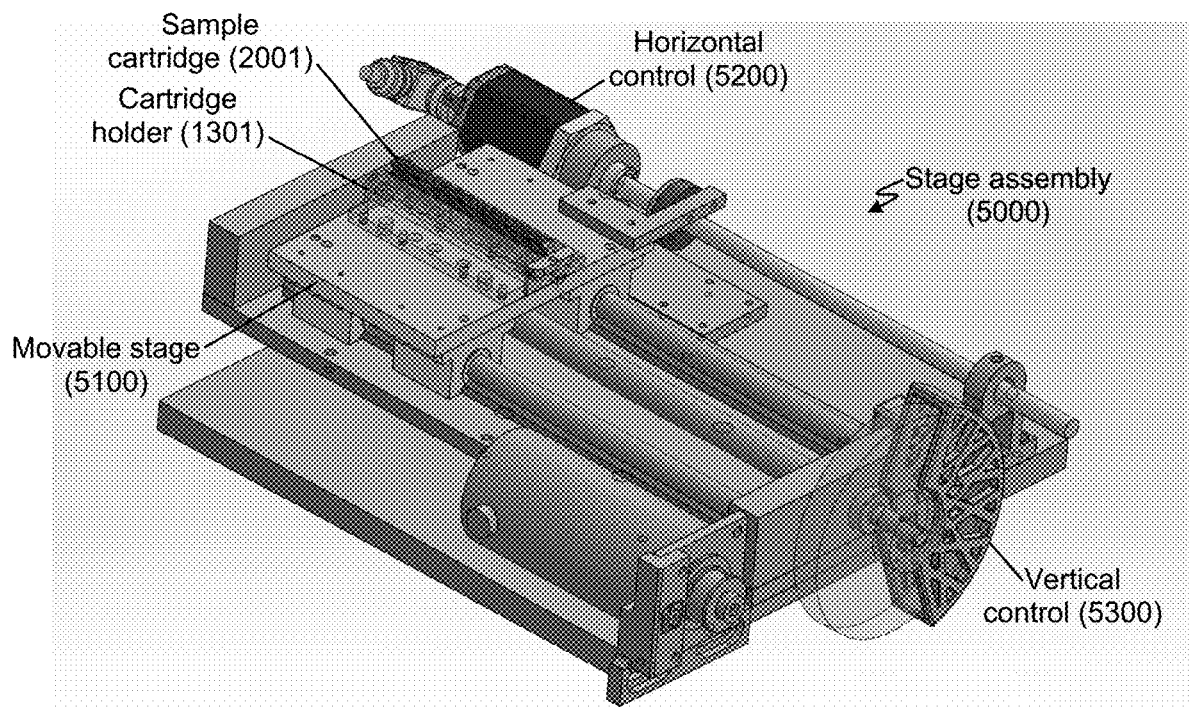
FIG. 5 shows an exemplary stage assembly 5000.

FIG. 5 provides an exemplary stage assembly 5000 configured to move the cartridge holder 1301, which in turn houses a sample cartridge 2001. The stage assembly 5000 includes a movable stage 5100 (e.g., configured to be moved by the horizontal and vertical controls), a horizontal control 5200 (e.g., configured to receive one or more electronic horizontal control signals from a processor to move in a horizontal direction at the specific distance and speed) and a vertical control 5300 (e.g., configured to receive one or more electronic vertical control signals from a processor to move in a vertical direction at the specific distance and speed).

The stage assembly can include any useful structure or component, such as a rack-and-pinion structure, linear bearing(s), support plate(s), mounting plate(s), driver(s), bracket(s), stepper motor(s), rotating chuck(s), actuator(s), etc. The stage assembly can be configured to be processor-controlled, motorized, etc. Further, the stage assembly can be configured to move in any useful direction, such as x-, y-, and/or z-directions, including rotational movement. For instance, each component can be configured to respond to an electronic control signal provided by a processor that is electrically connected to the stage assembly.

Processor and Process Workflows

Figure 7:
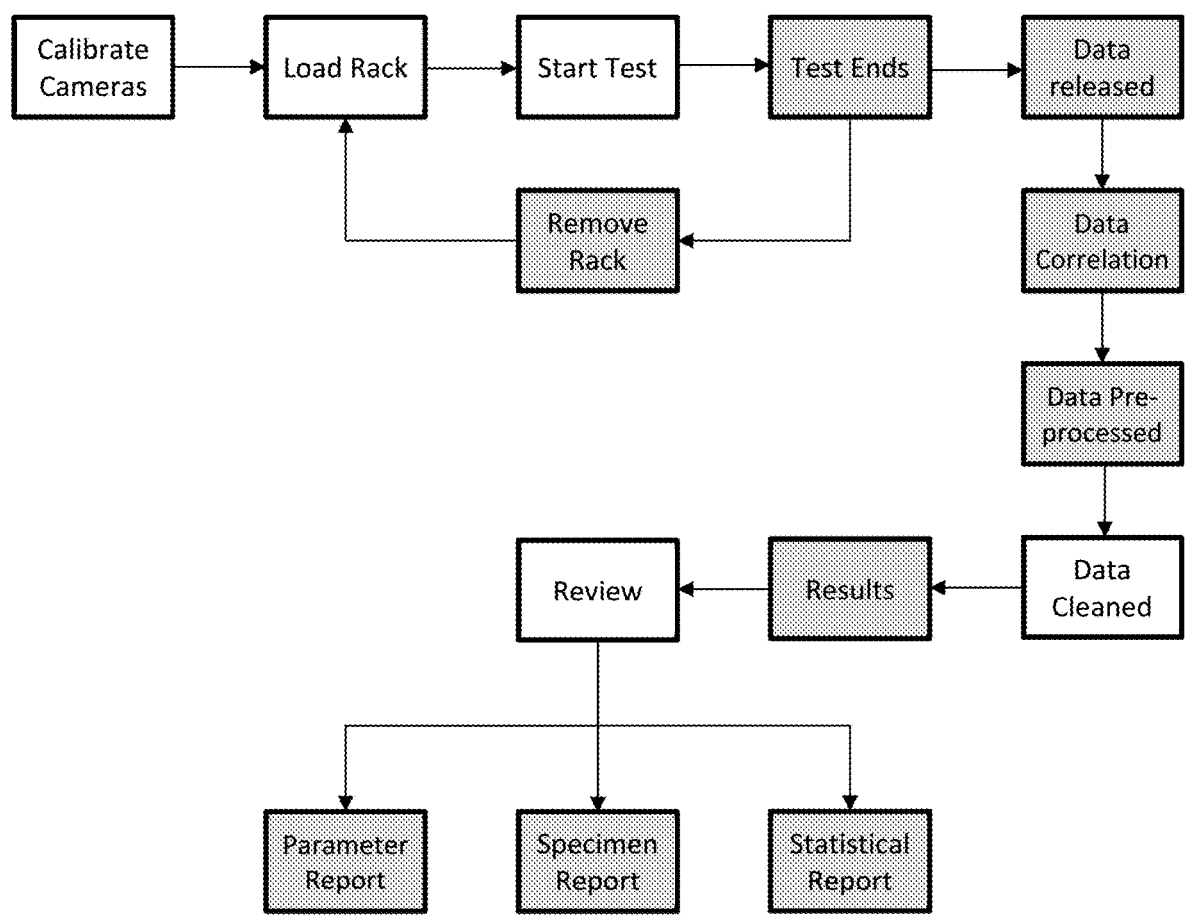
FIG. 7 shows an exemplary process workflow for obtaining a stress measurement.
Figure 8:
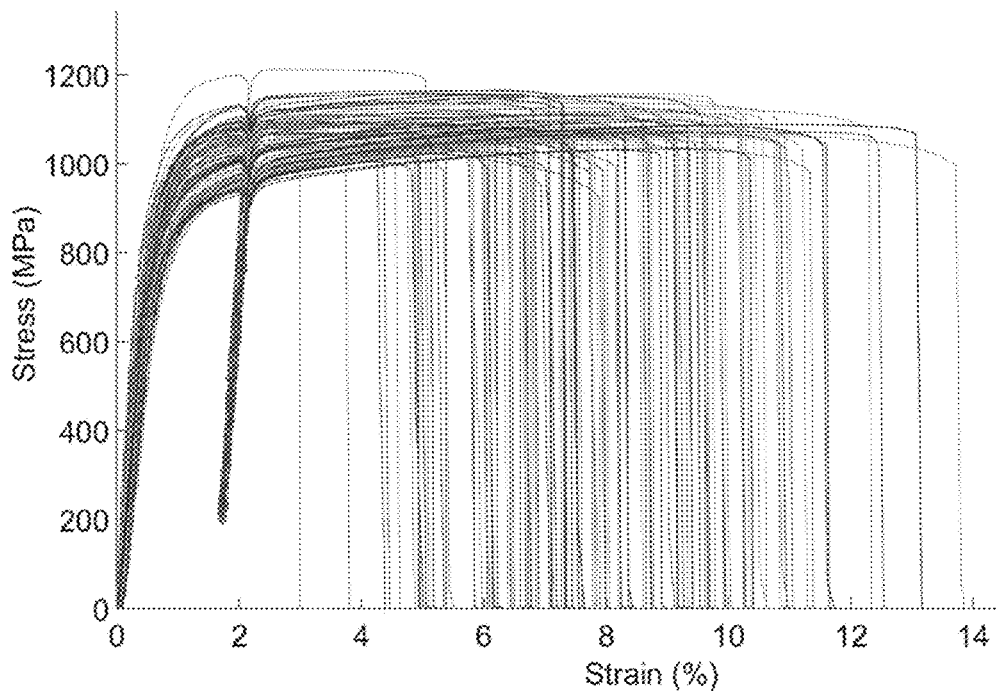
FIG. 8 shows exemplary stress measurements obtained in a high throughput manner.

The present invention can include methods and apparatuses that can employ a processor to operate components of the apparatus. In one embodiment, the processor is configured to be electrically coupled to a component (e.g., a gripper assembly, a stage assembly, and/or a camera), to generate control signal(s) to operate each component, and/or to receive detection signal(s) from each component. The processor can be further configured to process such control signal(s) and/or detection signal(s) to operate the apparatus, as well as to provide experimental results. FIG. 7 provides an exemplar process workflow for obtaining a stress measurement, and FIG. 8 shows exemplary stress measurements obtained in a high throughput manner.

EXAMPLES

Example 1: High-Throughput Sequential Tensile Testing

In one non-limiting embodiment, the present invention provides an apparatus or configuration that permits rapid sequential independent tensile testing of multiple material test samples (e.g., coupons). In one non-limiting instance, the multiple test samples are linked together, and a movable stage assembly is employed to test each sample in a serial manner. This could allow for efficient collection of statistical datasets or exploration of parametric variations in material/geometry.

This apparatus can be applied to any material obtained by any manufacturing process that can fashion a tensile dog-bone geometry. In one instance, additive manufacturing is employed, since it is possible to fabricate the complex shape of the tensile bar integral with the segmented chain structure. However, it is possible to also produce a carrier into which a plurality of test samples can be loaded. Dogbone tensile bars with button-head grip ends allow the most obvious form of gripping, although many possible gripping configurations are possible, such as methods to engage fibers, sheets, etc.

In one non-limiting embodiment, the sequential tensile tester is operated by means of an external actuator for both displacement and force measurements. Any actuator is conceivable: electrostatic, electromechanical, piezoelectric, servohydraulic, etc. In this way, the sequential tester could become a freestanding high-throughput test device capable of actuating and sensing a progression of independent sequential tensile tests.

High throughput tension (HTT) testing could allow for hundreds or even thousands of tension tests to be measured to provide statistically-significant measurements. Such measurements can uncover more subtle effects of changes in processing variables used to manufacture samples. Furthermore, HTT tests can provide "deep" data including full stress-strain curves and full-field images of deformation from which strain fields can be obtained. A range of specimen sizes can be tested, e.g., from sub-millimeter cross sections to cross sections of 0.25×0.25 inches and larger as necessary.

Such high throughput tension testing can include use of streamlined testing software and batch processing, both on specimens before testing and on data after testing, thereby automating many of the small repetitive tasks. The use of digital image correlation can minimize the need to install and zero extensometers. Simple extensometer measurements can be returned immediately, and saved images can be processed for a full analysis.

Example 2: Robust Processing Study of Additively Manufactured 316L Stainless Steel Enabled by High-Throughput Tensile Testing Laser-powder bed fusion (L-PBF) (see, e.g., ISO/ASTM52900-15, "Standard terminology for additive manufacturing-general principles-terminology," ASTM International (West Conshohocken, Pa.), 2015, 9 pp.) is a maturing additive manufacturing (AM) technology that constructs three-dimensional components layer-by-layer by locally melting and fusing metallic powder (see, e.g., Bourell D L et al., "Multiple material systems for selective beam sintering," U.S. Pat. No. 4,944,817, issued Jul. 31, 1990). The L-PBF technique enables geometric complexities and production agility not possible using traditional manufacturing techniques without sacrificing mechanical performance.

It has been demonstrated that AM metals can possess ultimate tensile strengths (UTS), yield strengths and tensile elongations comparable to their wrought counterparts (see, e.g., [3] Boyce B L et al., "Extreme-value statistics reveal rare failure-critical defects in additive manufacturing," *Adv. Eng. Mater.* 2017; 19(8):1700102 (10 pp.); Gorsse S et al., "Additive manufacturing of metals: a brief review of the characteristic microstructures and properties of steels, Ti-6Al-4V and high-entropy alloys," *Sci. Technol. Adv. Mater.* 2017; 18(1):584-610; Lewandowski J J et al., "Metal additive manufacturing: a review of mechanical properties," *Annu. Rev. Mater. Res.* 2016; 46:151-186; Madison J D et al., "Corroborating tomographic defect metrics with mechanical response in an additively manufactured precipitation-hardened stainless steel," *AIP Conf. Proc.* 2018; 1949 (1):020009 (8 pp.); and Salzbrenner B C et al., "High-throughput stochastic tensile performance of additively manufactured stainless steel," *J. Mater. Process. Technol.* 2017; 241:1-12). In some of these instances, UTS and yield strengths are improved over wrought material with a concomitant loss in tensile ductility. This potential has generated interest in refining L-PBF technologies for various alloys, including stainless steels (see, e.g., Gorsse S et al., *Sci. Technol. Adv. Mater.* 2017; 18(1):584-610; Lewandowski J J et al., *Annu. Rev. Mater. Res.* 2016; 46:151-186; and Foster S J et al., "Process-defect-structure-property correlations during laser powder bed fusion of alloy 718: role of in situ and ex situ characterizations," *Metallurg. Mater. Trans. A* 2018; 49(11):5775-5798). One of the primary challenges to the implementation of L-PBF technologies is the development of qualification pathways for material performance (see, e.g., Boyce B L et al., *Adv. Eng. Mater.* 2017; 19(8):1700102 (10 pp.); Gorsse S et al., *Sci. Technol. Adv. Mater.* 2017; 18(1):584-610; Madison J D et al., *AIP Conf. Proc.* 2018; 1949(1):020009 (8 pp.); Salzbrenner B C et al., *J. Mater. Process. Technol.* 2017; 241:1-12; Jared B H et al., "Additive manufacturing: toward holistic design," *Scripta Mater.* 2017; 135:141-147; Frazier W E, "Direct digital manufacturing of metallic components: vision and roadmap," *Solid Freeform Fab. Proc.*, University of Texas at Austin (Austin, Tex.), 2010, pp. 717-732; Bourell D L et al., "Roadmap for additive manufacturing: identifying the future of freeform processing," University of Texas at Austin (Austin, Tex.), 2009, 92 pp.; and Seifi M et al., "Overview of materials qualification needs for metal additive manufacturing," *JOM* 2016; 68(3):747-764). Specific challenges include: (1) assessing the influence of processing parameters on microstructure and mechanical performance and (2) characterizing statistical variability in mechanical performance.

Understanding the relationships between processing parameters and their influence on microstructure and mechanical performance can be leveraged to develop rapid qualification pathways for L-PBF alloys. To this end, the influence of AM processing conditions on effective mechanical properties, microstructure, build quality, and defect quantity of metal AM has been reported in the literature (see, e.g., Bourell D L et al., "Roadmap for additive manufacturing: identifying the future of freeform processing," University of Texas at Austin (Austin, Tex.), 2009, 92 pp.; Seifi M et al., *JOM* 2016; 68(3):747-764; Cherry J A et al., "Investigation into the effect of process parameters on microstructural and physical properties of 316L stainless steel parts by selective laser melting," *Int. J. Adv. Manuf. Technol.* 2015; 76(5-8):869-879; Miranda G et al., "Predictive models for physical and mechanical properties of 316L stainless steel produced by selective laser melting," *Mater. Sci. Eng. A* 2016; 657:43-56; and Sun Z et al., "Selective laser melting of stainless steel 316L with low porosity and high build rates," *Mater. Design* 2016; 104: 197-204).

It has been shown that these properties exhibit complex relationships with build conditions such as laser power, velocity, hatch spacing, raster pattern, build orientation, and layer thickness. The concept of process-parameter maps has been suggested as a method to understand and interpret these relationships (see, e.g., du Plessis A et al., "Application of microCT to the non-destructive testing of an additive manufactured titanium component," Case *Studies Nondestruct. Test. Eval.* 2015; 4:1-7; Yadollahi A et al., "Additive manufacturing of fatigue resistant materials: challenges and opportunities," *Int. J. Fatigue* 2017; 98:14-31; and Kim F H et al., "Literature review of metal additive manufacturing defects," *NIST Advanced Manufacturing Series (NIST AMS)* No. 100-16, 2018, 17 pp.).

Figure 9:
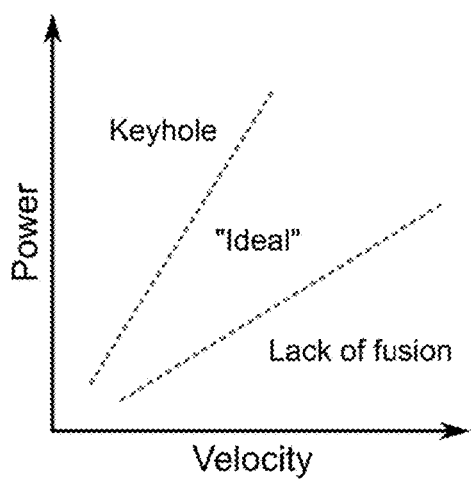
FIG. 9 shows exemplary schematic depiction of a simplified power-velocity defect parameter map.

Process maps allow for the visualization of a material property as a function of process parameters. FIG. 9 presents a very simplified process parameter map, depicting a schematic of how process parameters, specifically laser power and scan velocity, are expected to influence dominant pore types in L-PBF printed parts. These two parameters are of interest because they directly relate to heat input into the system, a critical component for melt dynamics (see, e.g., Khairallah S A et al., "Laser powder-bed fusion additive manufacturing: physics of complex melt flow and formation mechanisms of pores, spatter, and denudation zones," *Acta Mater.* 2016; 108:36-45). While FIG. 9 presents a very simple process map, similar maps have been developed to understand trends not only in internal defect content but also surface roughness, geometric precision, density, and mechanical properties (see, e.g., Clymer D R et al., "Power-velocity process design charts for powder bed additive manufacturing," *J. Mech. Design* 2017; 139(10):100907 (7 pp.)). Mechanical property maps often indicate a more continuous trend in properties. However, to our knowledge, the process parameter maps rarely examine the statistical robustness of properties resulting from a particular process parameter setting. Given that heterogeneous defects contribute significantly to mechanical performance, one might expect properties to not solely exist as deterministic (single-valued) solutions for a given process setting, but rather be stochastic in nature. Furthermore, one might expect the incipient formation of defects to trigger a steep change in performance rather than a steady trend.

Microstructural heterogeneities inherent to the printing process have been shown to contribute to variability in mechanical performance of AM materials (see, e.g., du Plessis A et al., *Case Studies Nondestruct. Test. Eval.* 2015; 4:1-7; and Yadollahi A et al., *Int. J. Fatigue* 2017; 98:14-31). One type of defect expected to contribute to this variability is porosity formed during the printing process. Three types of internal defects are common in L-PBF: (1) keyhole defects, (2) lack-of-fusion (LOF) defects and (3) residual powder porosity (see, e.g., Kim F H et al., *NIST Advanced Manufacturing Series (NIST AMS)* No. 100-16, 2018, 17 pp.).

Keyhole defects often form at high laser powers and slow laser scan speeds, and are formed by the intermittent collapse of, typically high aspect ratio, melt pools due to the dynamic and ever-changing imbalance between vapor recoil pressure and the depressed molten volume. These intermittent events collapse and trap gas pockets near the bottom of melt pools (see, e.g., Elmer J W et al., "The effect of reduced pressure on laser keyhole weld porosity and weld geometry in commercially pure titanium and nickel," *Weld. J.* 2016; 95:419-430; Lu F et al., "Formation and influence mechanism of keyhole-induced porosity in deep-penetration laser welding based on 3D transient modeling," *Int. J. Heat Mass Transfer* 2015; 90:1143-1152; Madison J D et al., "Advancing quantitative description of porosity in autogenous laser-welds of 304L stainless steel," *Integr. Mater. Manuf. Innov.* 2014; 3(1):141-157; Pang S et al., "3D transient multiphase model for keyhole, vapor plume, and weld pool dynamics in laser welding including the ambient pressure effect," *Opt. Lasers Eng.* 2015; 74:47-58; Madison J D et al., "Quantitative characterization of porosity in laser welds of stainless steel," *Scripta Mater.* 2012; 67(9):783-786; Norris J T et al., "Effects of laser parameters on porosity formation: investigating millimeter scale continuous wave Nd:YAG laser welds," *Weld. J.* 2011; 90(10):1985-203s; and Semak V et al., "The role of recoil pressure in energy balance during laser materials processing," *J Phys. D Appl. Phys.* 1997; 30(18):2541-2552).

LOF defects form when powder does not fully melt. They typically form when melt pool spacings, i.e. hatches, do not overlap completely but can occur in any printed material due to process upsets in the melt pool (see, e.g., Kim F H et al., *NIST Advanced Manufacturing Series (NIST AMS)* No. 100-16, 2018, 17 pp.; and Qiu C et al., "On the role of melt flow into the surface structure and porosity development during selective laser melting," *Acta Mater.* 2015; 96:72-79). Residual powder porosity typically results from porosity produced during feedstock formation via atomization (see, e.g., Finfrock C B et al., "Effect of hot isostatic pressing and powder feedstock on porosity, microstructure, and mechanical properties of selective laser melted AlSi10Mg," *Metallogr. Microstruct. Anal.* 2018; 7(4):443-456). While these internal defects are most common at certain build conditions, the literature suggests that there can exist a non-negligible amount of variation in defect content for "fully dense" nominal processing parameters (see, e.g., Seifi M et al., *JOM* 2016; 68(3):747-764; and Tapia G et al., "Prediction of porosity in metal-based additive manufacturing using spatial Gaussian process models," Additive Manuf. 2016; 12(B):282-290). The stochastic distribution of these internal defects contributes partially to the high variability in mechanical behavior of AM metals.

Salzbrenner et al. used high-throughput tensile testing to demonstrate the large variability in mechanical performance of 17-4PH stainless steel manufactured using two different L-PBF vendors (see, e.g., *J. Mater. Process. Technol.* 2017; 241:1-12). They demonstrated that the variability of mechanical performance in L-PBF stainless steel can be much greater compared to the variability in traditional wrought material. This large variability in mechanical performance, even across material within a single build, is a challenge to qualification. Thus, there exists a critical need to evaluate the variability in mechanical performance, defect quantity, and build quality of metal AM across the existing process-parameter space. However, the number of samples needed to evaluate variability is often time and cost prohibitive using traditional mechanical testing technologies.

The present study investigates how the processing parameters of L-PBF printed 316L influence stochastic mechanical properties. Mean performance of this material has been previously studied, but the inherent variability of performance across parameter space has not. Furthermore, this study relates variability in performance at different process settings to changes in microstructure, including grain morphology and defect populations. A previous system was utilized as a proof-of-concept to highlight the stochastic mechanical behavior of additively manufactured metals (see, e.g., Salzbrenner B C et al., *J. Mater. Process. Technol.* 2017; 241:1-12); based on these concepts, a new highly automated high-throughput test frame was developed to permit hundreds of tensile experiments within a timeframe and cost comparable to a dozen conventional tensile tests, as described herein. The high-throughput tests reveal statistically significant trends in mechanical performance that would have been convoluted by uncertainty if the test data only contained a few samples at each process parameter using traditional tensile methods. To interpret the changes in mechanical properties, both defect and grain structures of the printed samples were analyzed at various processing conditions.

As discussed herein, the mechanical properties of additively manufactured metals tend to show high variability, due largely to the stochastic nature of defect formation during the printing process. This study seeks to understand how different processing parameters (e.g., laser power, scan velocity, and scan pattern) can influence the mechanical behavior of additively manufactured stainless steel 316L. A newly developed high-throughput test methodology is used to understand the variable nature of the tensile behavior at different print conditions, and to allow for statistically meaningful analysis. Microstructural characterization through computerized tomography and electron backscatter diffraction is used to understand some of the observed trends in mechanical behavior. Specifically, grain size and morphology are shown to depend on processing parameters and influence the observed mechanical behavior. In the current study, laser-powder bed fusion, also known as selective laser melting or direct metal laser sintering, is shown to produce 316L over a wide processing range without substantial detrimental effect on the tensile properties. Ultimate tensile strengths above 600 MPa, which are greater than that for typical wrought annealed 316L with similar grain sizes, and elongations to failure greater than 40% were observed. It is demonstrated that this process has little sensitivity to minor intentional or unintentional variations in laser velocity and power. Additional details follow.

Example 3: Experimental Methods

In this Example, provided are exemplary experimental methods for data discussed in the following Examples 4 and 5.

Figure 10:
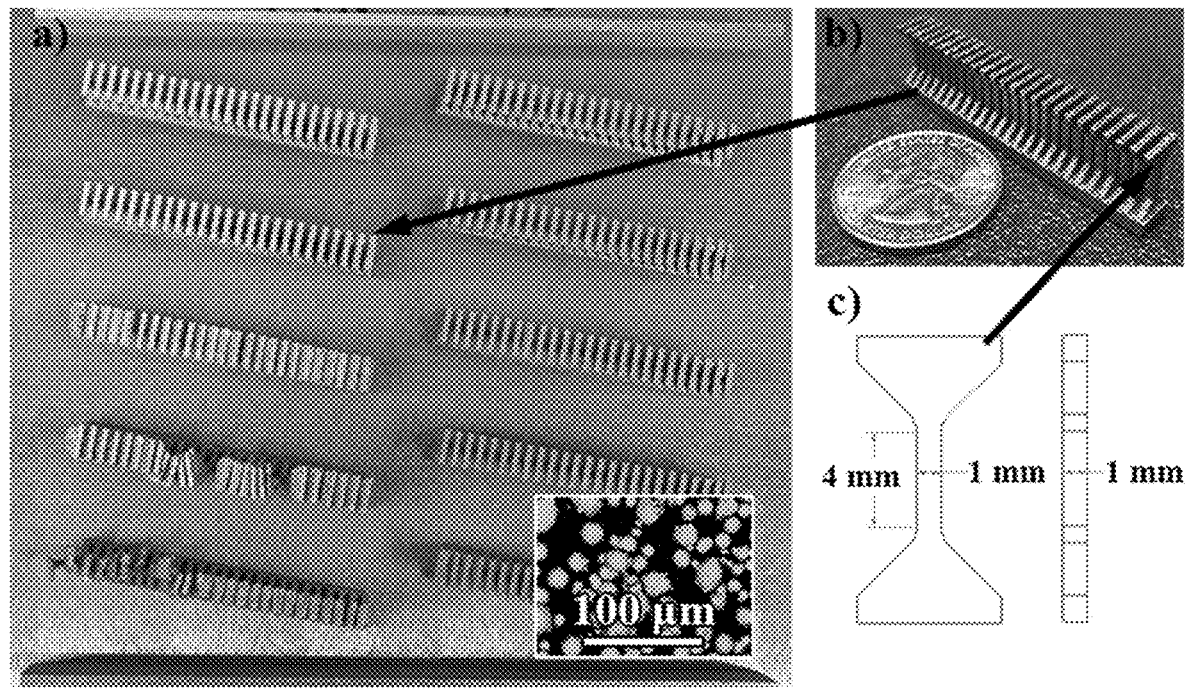
FIG. 10 shows (a) a representative print tray providing samples printed at varying powers, where the inset shows an SEM image of the powder, (b) a single rack of printed samples removed from the tray, and (c) the tensile geometry.

All samples in this manuscript were printed with a ProX™ DMP 200 selectively laser sintered powder bed 3D printer using a PHENIX™ 316L powder from 3D Systems. High resolution images of the powder are presented in the subset of FIG. 10(*a*), where the powder was generally observed to have a spherical geometry. Particle size analysis was performed on the powder, finding a mean powder diameter of 20 µm. The previous studies on high-throughput testing involved the testing of individual tensile specimens ("Generation I"), see Salzbrenner B C et al., "High-throughput stochastic tensile performance of additively manufactured stainless steel," *J. Mater. Process. Technol.* 2017; 241:1-12. Presently, a new method of high-throughput testing ("Generation II") was developed to automate the sequential loading of a series of tensile bars which are printed in a monolithic array. Printed arrays were designed specifically for the high-throughput set-up where each contained a total of 25 tensile samples, as illustrated in FIG. 10. Tensile samples had ratios consistent with geometries in ASTM E8, with a 1×1×4 mm reduced section with and utilized a 45° dovetail grip section for automated testing procedures. Each build plate contained up to 10 of these arrays (for a total of up to 250 tensile samples per build), with each array within the build printed under a specific set of processing parameters.

Processing parameters of interest in this study include laser power, scan velocity, and scan pattern (note, in the ProX™ system, there is no direct control over the scan pattern, and all scan pattern names correspond to the name as defined by the DMP 200 system). All other build parameters were kept constant. All builds used a beam diameter of 100 µm and a cross feed of 50 µm. A total of four arrays were printed using the nominal parameters recommended by the instrument vendor: a hexagonal scan pattern, laser velocity of 1400 mm/s, and laser power of 103 W. Twenty-two additional arrays were printed with off-nominal conditions: including normal, concentric, and mesh scan patterns; laser velocities ranging from 1050 to 1750 mm/s, and laser powers ranging from 59 to 147 W. As outlined elsewhere (see, e.g., Bertoli U S et al., "On the limitations of volumetric energy density as a design parameter for selective laser melting," Mater. Design 2017; 113:331-340), a radiant energy density was calculated for the beam in each of these print conditions. For the range of parameters used in this study, the radiant energy density varied from 10 to 30 J/mm$^3$.

After printing, a series of characterization steps were performed on each array. An optical inspection was performed to determine whether the geometry of the printed arrays was consistent with the 3D models as shown in FIG. 10. Parts that were too deformed to be able to perform successful tensile tests were considered as "failed" parts. Density measurements were performed per ASTM B962 utilizing Archimedes' principle with a Mettler Toledo density measurement kit. Following this, 5 of the 25 samples were removed from select arrays for further characterization.

For microstructural characterization, samples were mounted and mechanically polished with a vibratory polisher, and electron backscatter diffraction (EBSD) was performed both in the loading axis plane and a transverse plane, utilizing an Oxford Symmetry CMOS EBSD in a Zeiss Supra 55VP Field Emission Scanning Election Microscope (SEM) at an accelerating voltage of 20 kV and step size of 2 µm. In addition to EBSD, computerized tomography (CT) scans were performed on the isolated and highly characterized selection of samples with a Zeiss Xradia 520 Versa 3D X-ray computed tomography microscope operated at 140 kV and 72 µA with 4× optical magnification and an exposure time of 3.5 seconds. The X-ray source to sample distance was 18 mm and the sample to detector distance was 51 mm; this technique allows for non-destructive visualization of the internal voids of each sample with a spatial resolution of 1.77 µm.

High-throughput monotonic tensile tests were performed on the remaining 20 samples from each of the successfully printed arrays, corresponding to a total of 420 tensile tests. Tests were performed on the custom-built Generation II high-throughput tensile stage, illustrated in FIG. 11. The tester included a servo-hydraulic tensile actuator, a single-axis servo-motor stage for automated sequential sample loading, two optical cameras mounted at different angles to the sample, and an MTS servo-hydraulic load frame with an Interface 9 kN load cell. Custom analysis software written in MATLAB computed stress-strain responses from observed force and strain measurements. The thickness and width of tensile samples were automatically determined from camera images utilizing custom image recognition software, and the cross-sectional areas of samples were calculated assuming a rectangular shape. Engineering strain was determined from on-the-fly non-contact digital image correlation (DIC) using VicSnap software. Tensile tests were performed at a nominal strain rate of $10^{-3}$ s$^{-1}$ with a time resolution of 0.02 s, determined by the frequency of images taken for DIC. At ~2% strain, the samples were unloaded to 100 MPa for an accurate measurement of elastic modulus and then re-loaded until failure. After each tensile sample was tested to failure, the sample was ejected from the top grips by pressurized gas, the upper grips were lowered, and the tensile array was advanced forward by a motorized stage, allowing for the subsequent test to be performed.

Example 4: Results of Mechanical and Structural Analysis

Figure 12A:
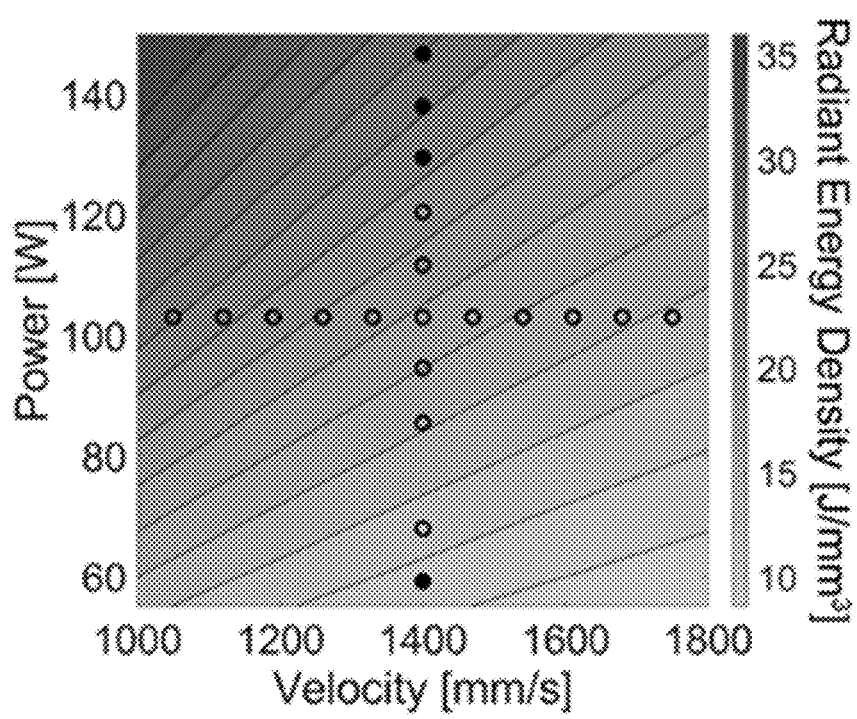
FIG. 12A-12B shows conformation of printed structures. Provided is (A) a graph showing all investigated printing parameters, where open figures represent prints that conformed to the 3D model and closed figures correspond to prints that failed to conform to the model. The background color of the image corresponds to the radiant energy density at those parameters, with a separation of 2 J/mm$^3$ for each contour plot regime. Also provided is (B) a graph showing the density of printed parts as a function of radiant energy density.
Figure 12B:
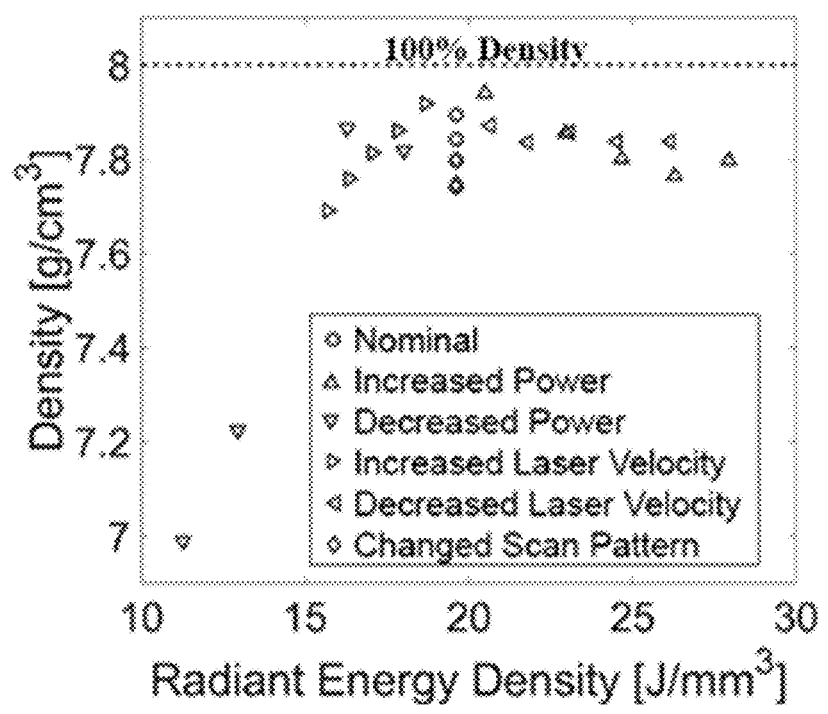

FIG. 12A indicates which printed parts conformed to the 3D model (open symbols) and which were too distorted for subsequent tensile testing (closed symbols). As can be observed, a total of 21 arrays conformed to the 3D model, whereas the only samples that failed to do so included those with relatively high or low laser powers, either above 121 W or below 68 W. Samples showed significant geometric distortion when the radiant energy density was above ~23 J/mm$^3$. However, decreasing velocities allowed successful prints despite reaching even higher radiant energy densities up to 28 J/mm$^3$. The mass density as a function of radiant energy density is illustrated in FIG. 12B.

Most parts showed consistent densities, with values of 7.8±0.2 g/cm$^3$, corresponding to densities in the range of 95-100% of fully dense 316L (see, e.g., Harvey P D, *Engineering properties of steel*, American Society for Metals (Metals Park, Ohio), 1982, 527 pp.). While these samples showed relative consistency in density, it is useful to note that the three samples printed with the highest laser power did not conform to the 3D model upon printing. The two arrays with the lowest laser powers, 59 W and 68 W, both showed measurably lower densities, with absolute densities of 87% and 90% respectively, and only the latter of these samples produced print geometries conforming to design.

Figure 13:
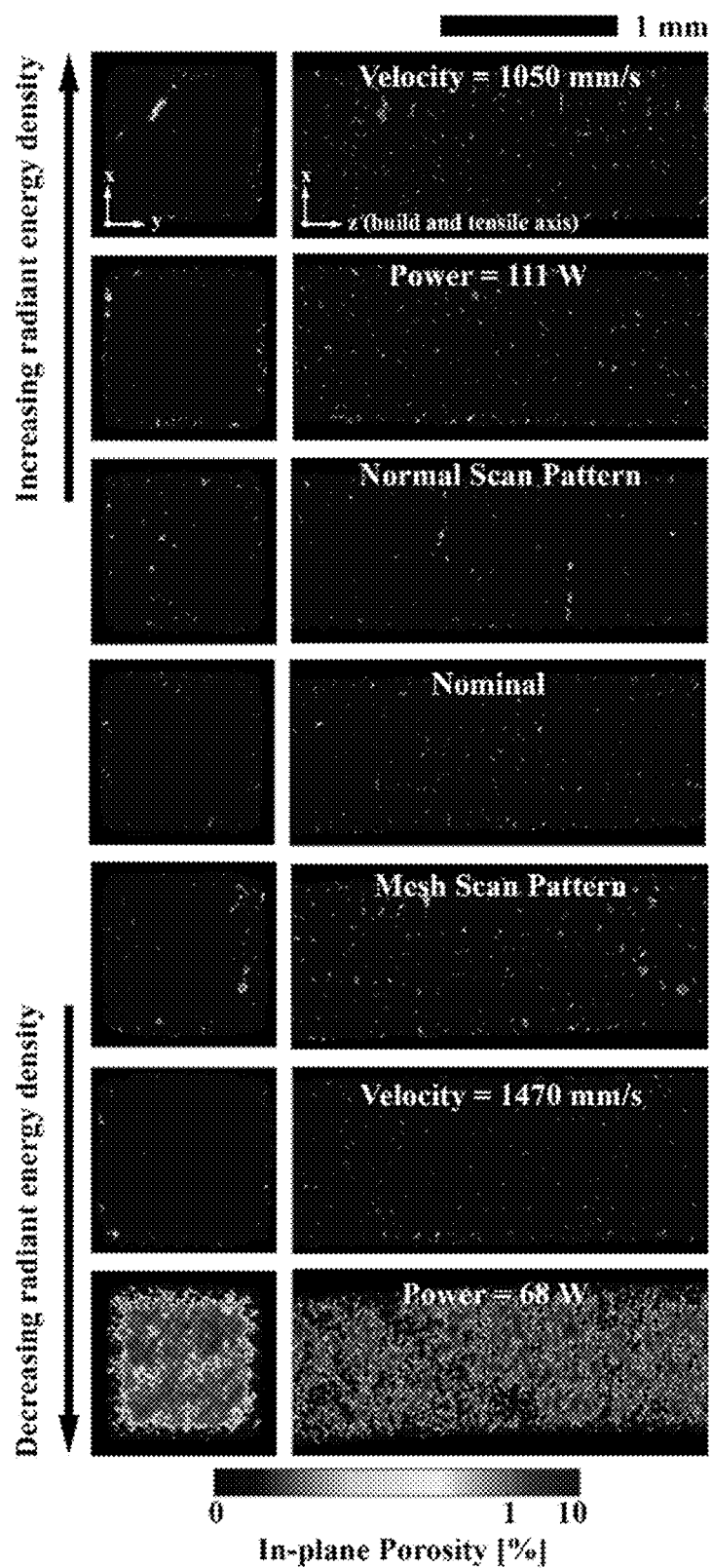
FIG. 13 shows projections of porosity in each imaged sample in both the loading (XY) and transverse (XZ) plane, representing the spatial porosity profile in each sample. The porosity is represented on a piecewise linear scale (linear from 0-1% and 1-10%) to represent the wide range of porosities observed in the samples.
Figure 14A:
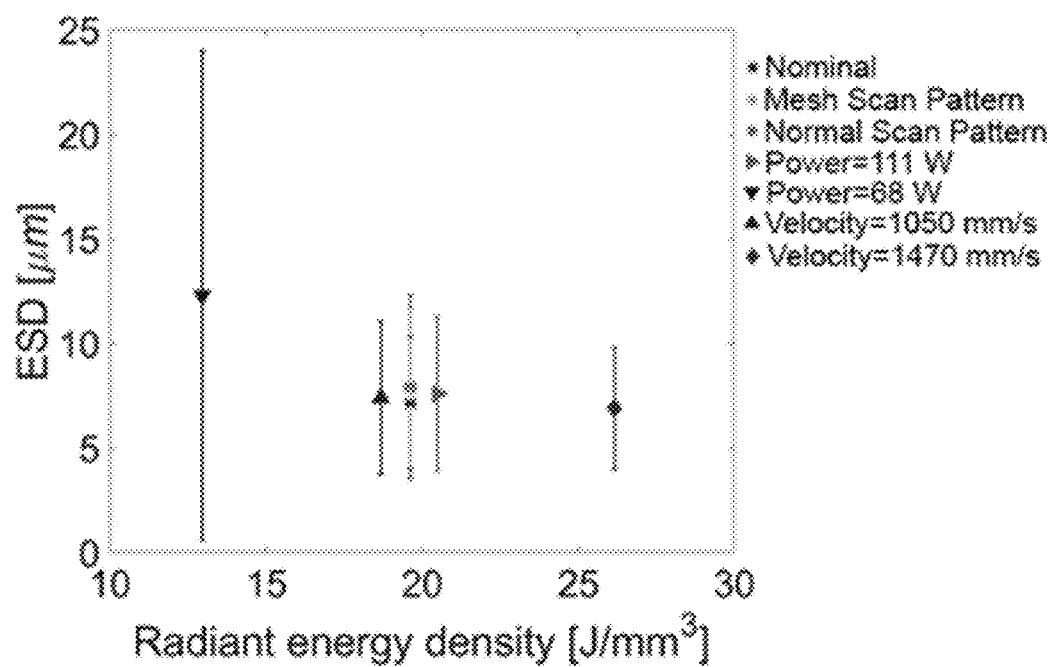
FIG. 14A-14B shows influence of processing parameters on global porosity values from CT, as represented in FIG. 13. Provided are graphs of (A) equivalent spherical diameter (ESD) and (B) total pore volume as a function of radiant energy density. Aside from the sample printed at a laser power of 68 W, the samples show similarities in ESD and total pore volume. The sample printed at 68 W shows an increase in both mean ESD and variation in void size, as well as a more than tenfold increase in total void volume.
Figure 14B:
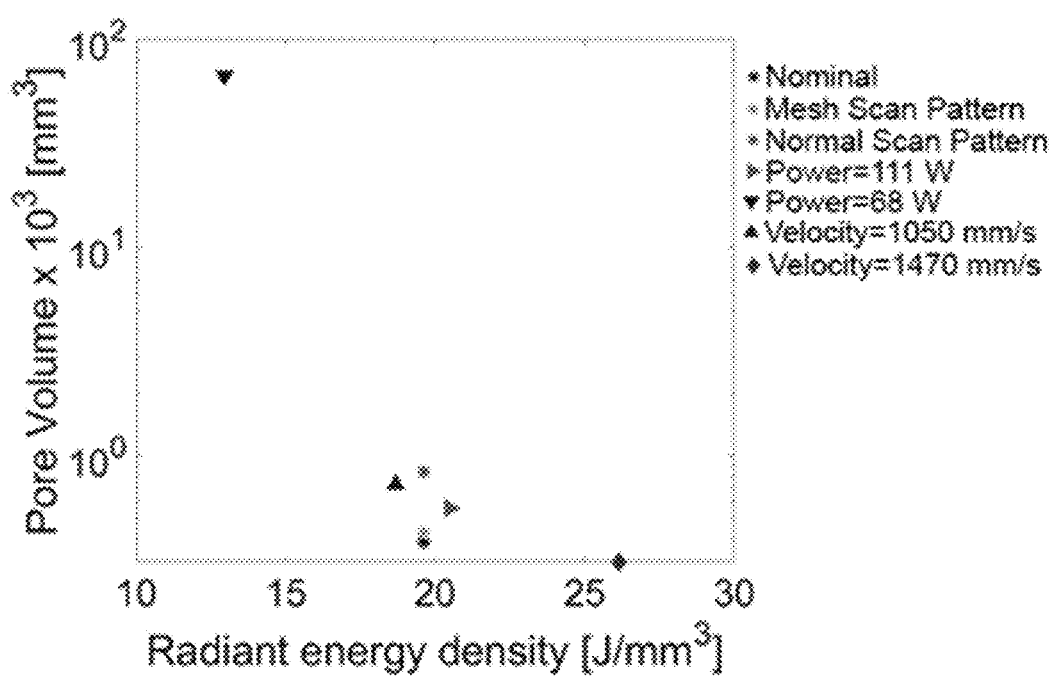

Projections of micro-CT scans showing through-thickness void densities as a function of location are shown in FIG. 13. To represent the wide range of void densities in the different samples, a piecewise linear scale was employed. As observed in this image, most of the samples showed comparable void distributions, sizes, and densities, except for the array printed with a laser power of 68 W; this sample contained an increase in size, total volume, and density of voids compared to all others. A numerical representation of the global void parameters is shown in FIG. 14A-14B, where these same trends are observed; a greater than 50× increase in total porosity was observed compared to the other analyzed samples.

Figure 15:
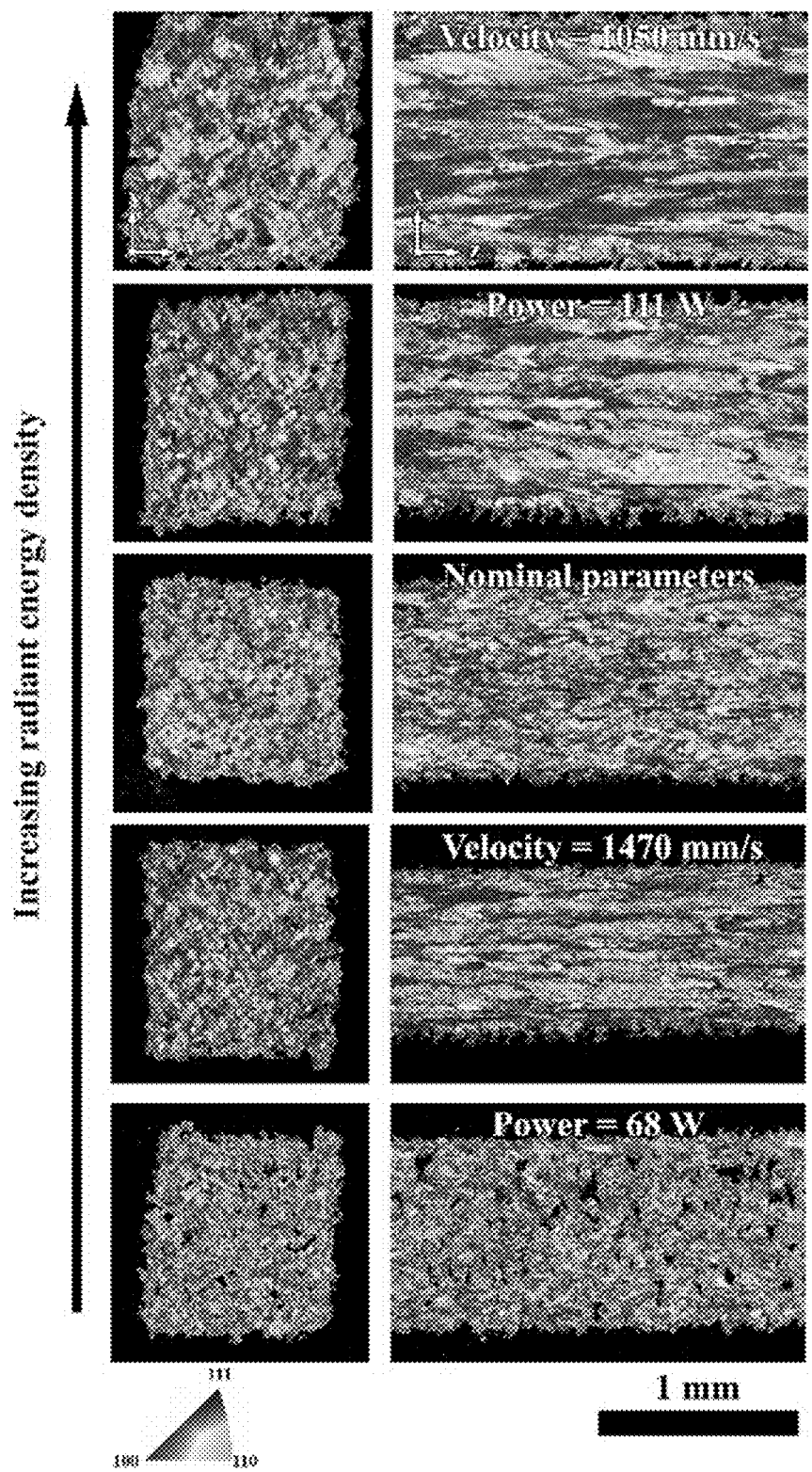
FIG. 15 shows EBSD maps in each of the imaged samples, representing the grain structure and orientation in the z-direction with the various print parameters. All orientations represent texture in the growth/tensile direction (z). Black spots correspond to regimes where the indexing confidence was low, due sample roughness, porosity in the sample, or grain overlap.

EBSD maps in FIG. 15 show the grain structures of as-printed specimens in both the build and transverse directions for samples with different powers and velocities. These correspond to the same samples presented earlier in FIG. 13. In addition to microstructural information, larger black regions within the images correspond to non-indexed regions due to void presence. These features are particularly noticeable in the sample printed at a laser power of 68 W. In general, all samples show a grid-like grain structure consistent with the laser scan directions in the XY plane, and most of the samples show elongated grains aligned with the build direction. There is a general increase in grain size with higher radiant energy densities, where the grain lengths in the transverse images (XZ plane) are observed to increase. Additionally, grains tend to show an increased prevalence of [100] textured grains in the build direction with increased radiant energy density.

Figure 16A:
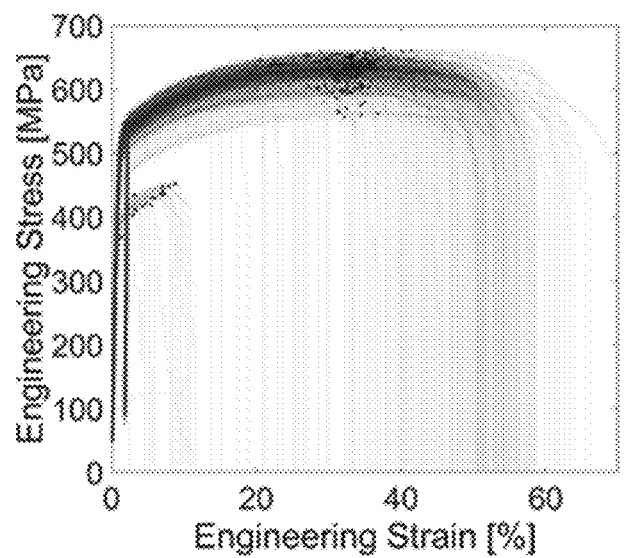
FIG. 16A-16D shows (A,B) stress-strain curves for the 420 samples investigated in this study and (C,D) Weibull plots representing the variability in tensile and yield strength. Opaque lines were utilized in the stress-strain curves to visualize all the data. In the full tensile curves in FIG. 16A, tensile strength is marked with a diamond for each sample, and total elongation is illustrated as a vertical line decreasing to a load of 0 MPa. In the reduced tensile curves of FIG. 16B, the 0.5% offset yield strength is marked by a diamond.
Figure 16B:
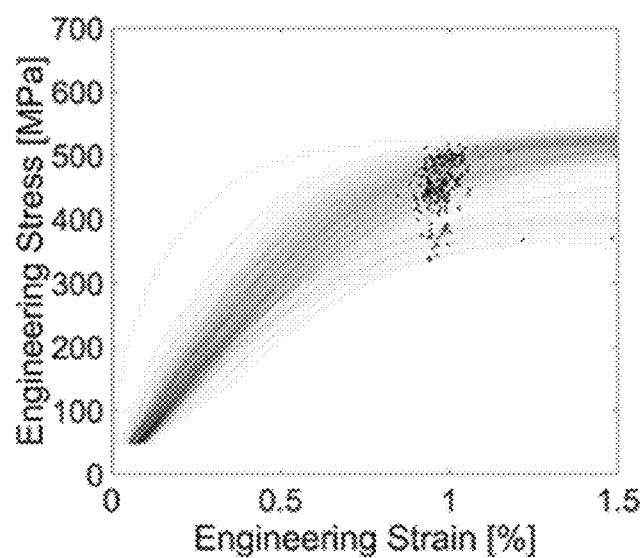

Tensile stress-strain curves are shown in FIG. 16A-16B. Yield strength, tensile strength, and total elongation are all indicated in the curves for each of the samples, demonstrating substantial variability. These distributions are represented by two parameter Weibull distributions displayed in FIG. 16C-16D. There is higher variability in all of these AM metals compared to that observed in wrought stainless steel 316L (see, e.g., Salzbrenner B C et al., *J. Mater. Process. Technol.* 2017; 241:1-12).

The average mechanical properties as a function of print parameters and radiant energy density are displayed in FIG. 17A-17D. For these materials, the array printed with the lowest power (68 W) had substantially reduced mechanical properties compared to all other sample sets, where it displayed the lowest mean yield strength, tensile strength, and elongation to failure. Some clear trends are seen in the remaining samples. Irrespective of the outlier case (68 W), the average UTS was relatively consistent across all process parameter space examined including sampled variations in power, scan velocity and scan pattern. At relatively high velocities however, slight decreases in tensile strength were observed while at lower scan velocities, a higher variability in tensile response was seen regardless of strength value. With respect to ductility, increases in power correlated positively while increases in scan velocity reduced ductile response. Both sets of observations are further bolstered by the radiant energy density results (FIG. 17D) which again show lower radiant energy densities (e.g., faster scan speeds and/or lower powers) reduce ductility while higher radiant energy densities (e.g., higher power and/or lower scan speeds) can reduce strength and increase variability in mechanical response. Examining process scan patterns reveals no conclusive trends, although property variability appears to be highest with a hexagon scan pattern. It is further noted that property variability at individual process settings exceeds in many cases the shifts in average values observed with changes in process settings.

Example 5: Discussion

Figure 11:
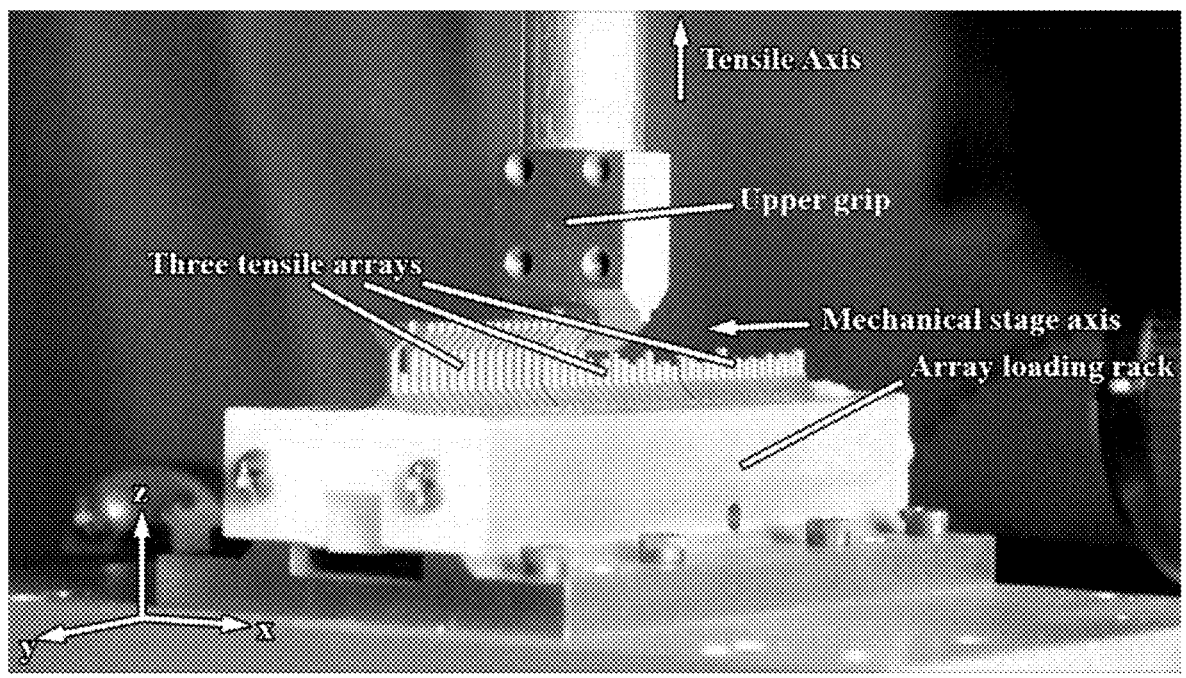
FIG. 11 shows a diagram of an exemplary generation II high-throughput tensile tester.

The data herein demonstrate the utility of high-throughput tensile testing as a method for statistically-informed process optimization. The Generation II setup, as illustrated in FIG. 10 and FIG. 11, provides an efficient method for characterizing the variable tensile behavior of AM metals. Many tensile samples can be produced on a single build plate. In the present case, 250 per build plate, although more can be produced via tighter packing or larger build volumes. Tensile tests were performed at a rate of ~25 tests per hour, with the capability to mount up to 75 tensile samples for automated testing. In the Generation I study (see, e.g., Salzbrenner B C et al., *J. Mater. Process. Technol.* 2017; 241:1-12), which was largely performed as a proof-of-concept, tensile samples were printed individually, and each sample was manually inserted into the test apparatus. The current study demonstrates that these concepts can be applied to achieve fully automated testing of additively manufactured metals to study their stochastic behavior, both improving the reliability of data by reducing the potential for human error and allowing for expansion of the number of parameters that can be explored through the continual testing of samples. The new system is not only ~10× faster than conventional methods but also reduces burden on the human operator and can potentially be expanded further to hold a larger quantity of samples, or to accommodate alternative experiments such as notched tension, fracture toughness, or low-cycle fatigue.

The high-throughput method revealed notable variability in AM mechanical properties, consistent with previous studies (see, e.g., Salzbrenner B C et al., *J Mater. Process. Technol.* 2017; 241:1-12; and Brown C U et al., "Interlaboratory study for nickel alloy 625 made by laser powder bed fusion to quantify mechanical property variability," *J Mater. Eng. Perform.* 2016; 25(8):3390-3397). Many of the trends in mean properties as a function of processing conditions are smaller in magnitude than the intrinsic variability across changes in process condition. As a result, if only a few measurements had been made for each process setting, as is typical in most process studies (see, e.g., Clymer D R et al., *J. Mech. Design* 2017; 139(10):100907 (7 pp.); Beuth J et al., "Process mapping for qualification across multiple direct metal additive manufacturing processes, *Solid Freeform Fab. Proc.*, University of Texas at Austin (Austin, Tex.), 2013, pp. 655-665; and Irrinki H et al., "Effects of powder attributes and laser powder bed fusion (L-PBF) process conditions on the densification and mechanical properties of 17-4 PH stainless steel," *JOM* 2016; 68(3):860-868), false conclusions may have been drawn regarding the effects of variation in the process settings examined. This highlights the necessity for high-quantity testing to confidently ascertain statistical trends.

Uncertainty in the estimate for Weibull parameters, as well as many other statistical predictors, scale no better than the square root of the number of samples (see, e.g., Ishwaran H, "Identifiability and rates of estimation for scale parameters in location mixture models," Ann. Statist. 1996; 24(4): 1560-1571), evidenced in practice in other statistical studies of mechanical data (see, e.g., Yang Y et al., "Sample sizes based on Weibull distribution and normal distribution for FRP tensile coupon test," *Materials* 2019; 12(1):126 (10 pp.)): a two-fold decrease in uncertainty typically requires a minimum of four times the number of samples. Because the natural variability in these materials is higher than wrought materials, a much larger quantity of samples would be required to achieve uncertainties on the same order of magnitude as is common with wrought materials.

Figure 16C:
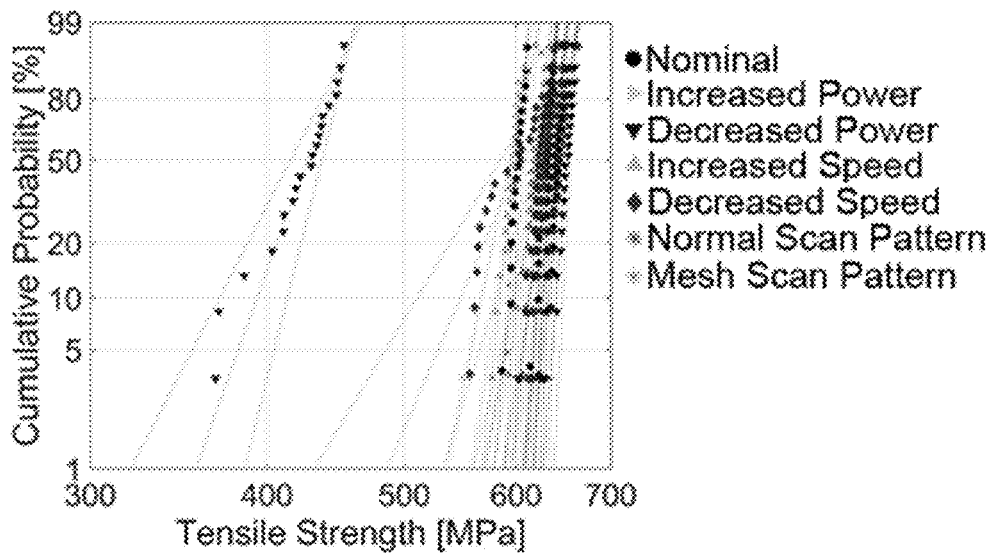
Figure 16D:
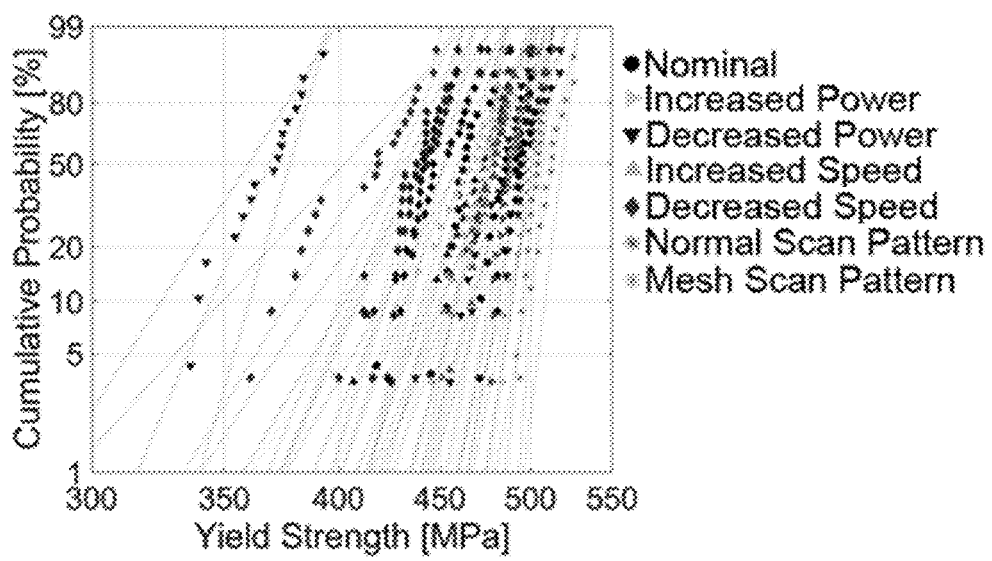
Figure 17A:
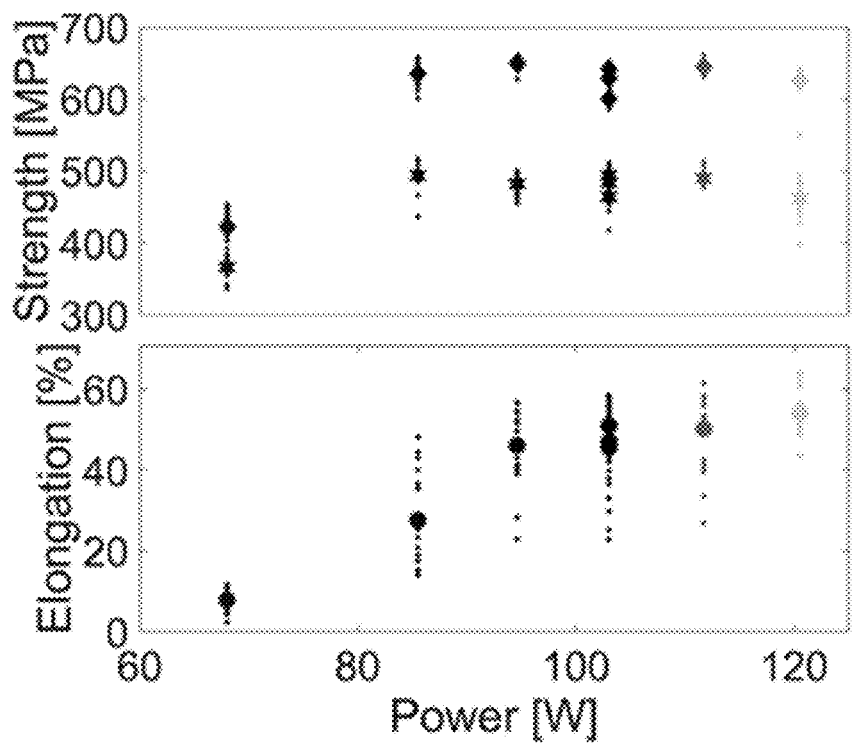
FIG. 17A-17D shows the dependence of tensile strength (diamonds), yield strength (crosses), and ductility (circles) on the independently varied process parameters of (A) power, (B) scan velocity, (C) scan pattern, and (D) radiant energy density. Large symbols correspond to mean values while small symbols correspond to single values from individual tests.
Figure 17B:
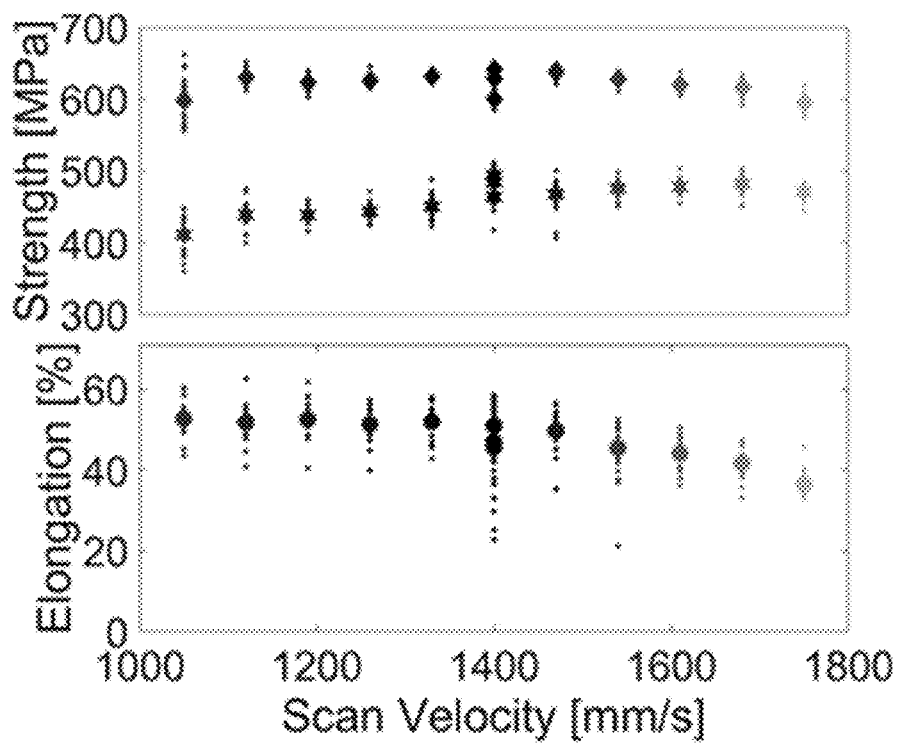
Figure 17C:
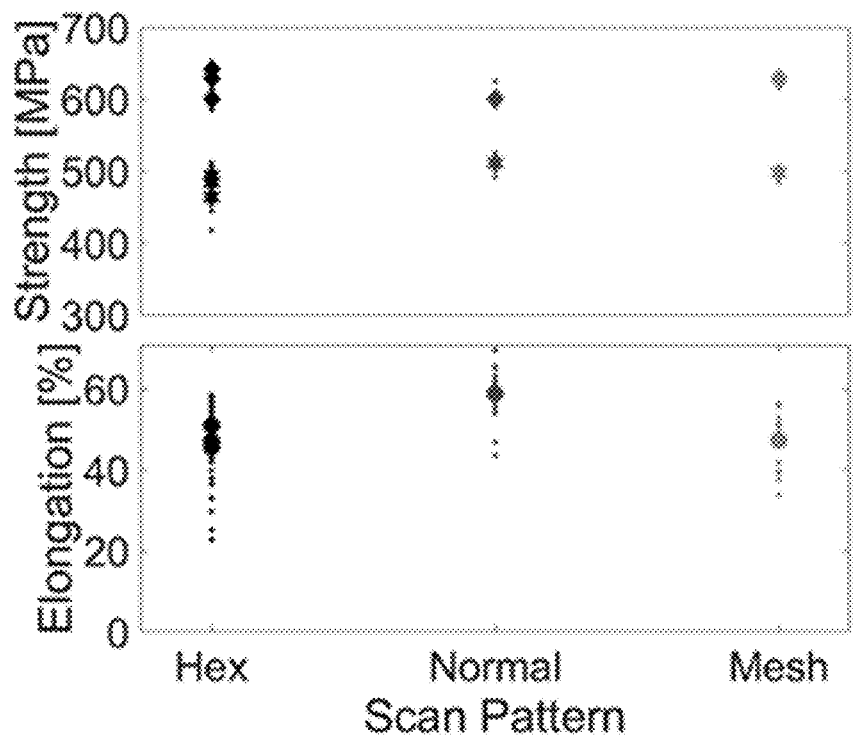
Figure 17D:
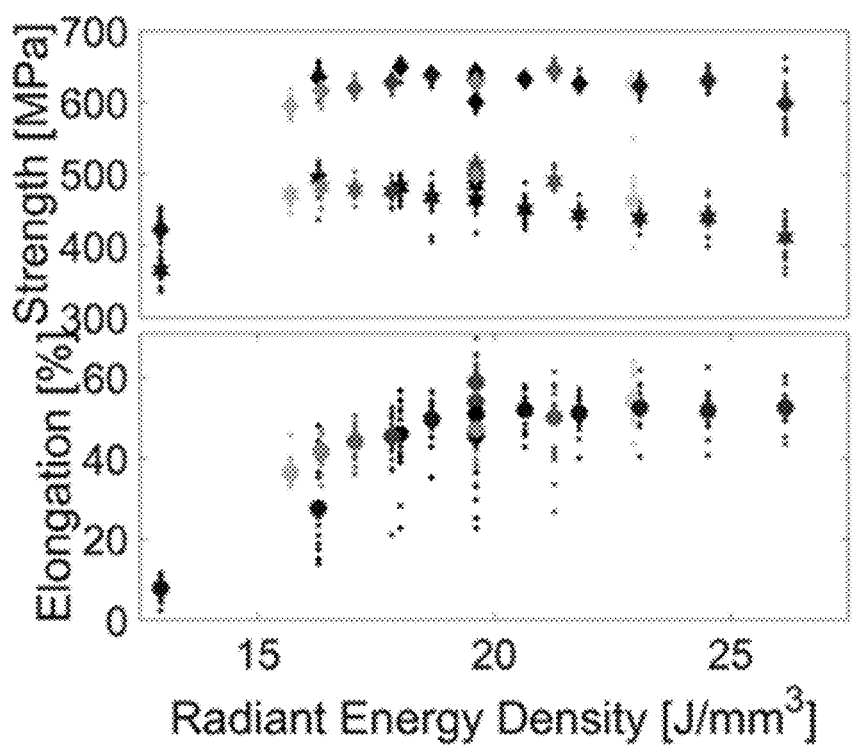

Even in this study, the 20 samples tested per processing condition leaves some statistical ambiguity, as evidenced in the Weibull plots of FIG. 16C-16D with overlapping 95% confidence intervals. This reduces the potential to differentiate the mechanical properties associated with certain process settings. With these sample quantities, only substantial differences in mechanical properties or trends over a wide range of parameters provide statistically meaningful insight. This sheds light on some previous research performed where processing parameters studies were performed to understand the performance on mechanical properties. An example is a study by Tolosa et al. (see e.g., Tolosa I et al., "Study of mechanical properties of AISI 316 stainless steel processed by "selective laser melting", following different manufacturing strategies," *Int. J. Adv. Manuf. Technol.* 2010; 51(5-8):639-647), where the influence of build direction on the tensile properties of AM 316L are explored; in that study, most of the build strategies showed statistically similar results, although only three tensile samples were used for each of these printing parameters. The use of high-through-put testing methodologies may have revealed more insight as to how scan strategy ultimately influences the mechanical properties of additively manufactured metals.

The results from this study, overall, highlight the robustness of the ProX 200 L-PBF process for producing 316L stainless steel. In this case, we define the process as robust as there is no detrimental impact on the mechanical properties, geometric conformance to design, or density of the printed materials over a relatively large range of laser power and velocity. As illustrated in FIG. 16A-16B and FIG. 17A-17D, however, tensile properties independent of processing changes can show significant statistical variation. This is illustrated primarily among the three nominally-identical tensile arrays printed with the baseline parameters. Since the trends in response here cannot be attributed to differences in process settings, these variations must be attributable to fluctuations in powder quality, natural variation in laser output parameters, local part geometry, and/or the stochastic nature of the powder distributions themselves (see, e.g., Kim F H et al., *NIST Advanced Manufacturing Series (NIST AMS) No.* 100-16, 2018, 17 pp.; Sutton A T et al., "Powder characterisation techniques and effects of powder characteristics on part properties in powder-bed fusion processes," *Virtual Phys. Prototyping* 2017; 12(1):3-29; and Sames W I et al., "The metallurgy and processing science of metal additive manufacturing," *Int. Mater. Rev.* 2016; 61(5): 315-360).

As illustrated in FIG. 17A-17D, when the process parameters are maintained in close association with the nominal power and velocity settings, the mean and statistical nature of the mechanical properties can be assessed systematically. This robustness provides additional flexibility over build parameters, where, for example, build speed can be improved by increasing the laser scan velocity above the nominal scan parameters. For instance, a 14% increase in scan speed from 1400 to 1600 mm/s would reduce print time, while achieving comparable strengths and 90% of the ductility. While this study focuses on the independent influence of power and velocity, a more comprehensive study of combined effects could further interrogate the breadth of the near-optimal print regime, and possibly identify further opportunities for increased speed or build volume with inconsequential or acceptable reductions in select properties.

Figure 18A:
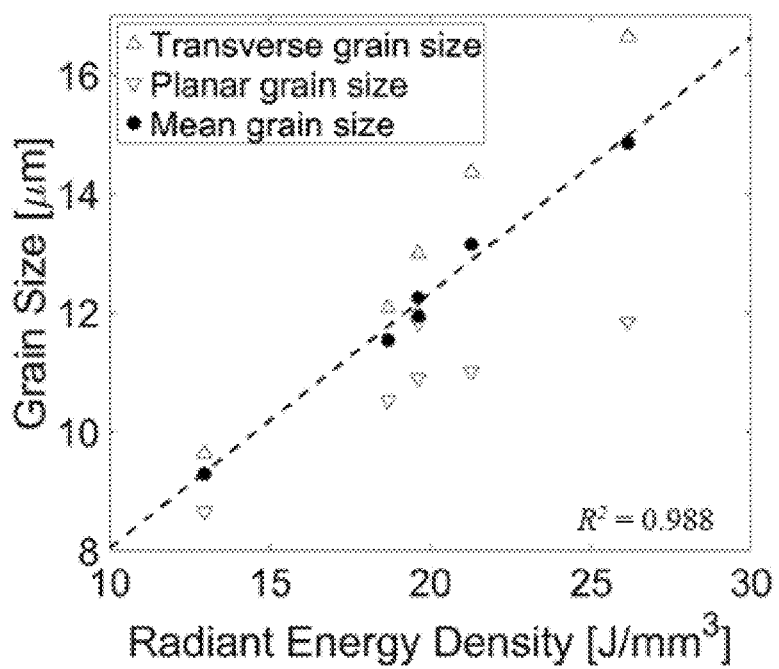
FIG. 18A-18B shows the measured average grain size from transverse (X-Z) and planar (X-Y) EBSD maps in FIG. 15 as a function of (A) radiant energy density and (B) measured yield strength as a function of measured and interpolated grain size from the samples. The dashed line represents the Hall-Petch strengthening observed in annealed wrought 316L (see, e.g., Singh K K et al., "Hall-Petch behaviour of 316L austenitic stainless steel at room temperature," *Mater. Sci. Technol.* 2002; 18(2): 165-172).
Figure 18B:
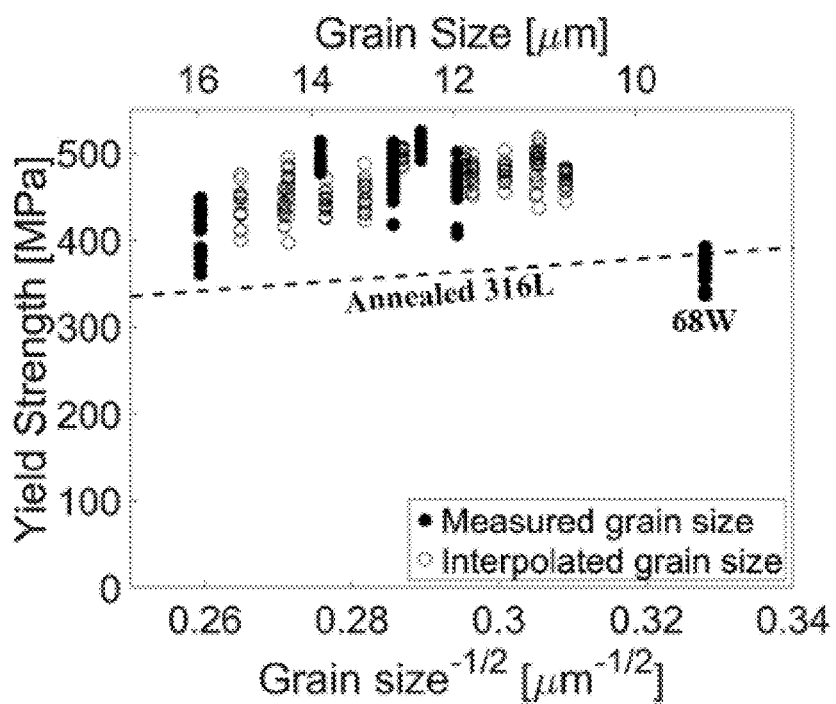

Previous studies have indicated that there is a complex relationship between processing parameters and microstructure (see, e.g., Clymer D R et al., *J. Mech. Design* 2017; 139(10):100907 (7 pp.); Beuth J et al., *Solid Freeform Fab. Proc.*, University of Texas at Austin (Austin, Tex.), 2013, pp. 655-665; and Irrinki H et al., *JOM* 2016; 68(3):860-868). Process parameters can drastically influence internal porosity, grain structure, dislocation content, and residual stress, which in turn can impact mechanical behavior. The influence of laser power and scan velocity were visualized via EBSD maps in FIG. 15, showing that samples with higher radiant energy density tended to possess larger grains and lower yield strengths. This is further illustrated more clearly in FIG. 18A, where the grain size in both the planar (X-Y) and transverse (X-Z) plane are observed to increase with increasing radiant energy density. Because the grains had a non-equiaxed shape, an average grain size for each sample was calculated as outlined in ASTM E112-13 (see, e.g., ASTM E112-13, "Standard test methods for determining average grain size," ASTM International (West Conshohocken, Pa.), 2013, 28 pp); the mean grain size showed a linear dependence on radiant energy. For samples that were not analyzed by EBSD, a mean grain size was interpolated from this data. The yield strength of all the samples as a function of both the measured and interpolated grain sizes are displayed in FIG. 18B. Samples with lower grain size tend to show higher yield strengths, consistent with Hall-Petch type strengthening. Compared to wrought annealed 316L (see, e.g., Singh K K et al., "Hall-Petch behaviour of 316L austenitic stainless steel at room temperature," Mater. Sci. Technol. 2002; 18(2):165-172), the AM samples tend to show a 100 MPa increase in yield strength, attributed to defect formation during rapid solidification. The 68 W sample acts as an outlier in this regard, likely due to the porosity degrading the material's mechanical properties.

As observed elsewhere (see, e.g., Gorsse S et al., *Sci. Technol. Adv. Mater.* 2017; 18(1):584-610), high porosity content can contribute significantly to the deterioration of mechanical properties. In the present study, the influence of porosity is most obvious in the sample printed at 68 W resulting in a sample density of only 90%. Although the printed tensile array conformed to the print geometry, it exhibited significantly lower tensile strength and ductility compared to all other samples. This degradation in mechanical properties can be attributed to the extraordinarily high porosity content found in this sample, as shown in FIG. 13 and FIG. 14A-14B, which displayed a more than 50× increase in total porosity. Based on the processing parameters and pore structure, the porosity in this sample is attributed primarily to LOF defects (see, e.g., Kim F H et al., *NIST Advanced Manufacturing Series (NIST AMS) No. 100-16*, 2018, 17 pp.; and Qiu C et al., *Acta Mater.* 2015; 96:72-79). In this sample, however, the detrimental effect of porosity on the yield strength was masked by the counteracting effect of the relatively fine grain size. According to density plots, the porosity of all other samples was below 5%, a level where monotonic tensile properties are only mildly influenced by porosity (see, e.g., Gorsse S et al., *Sci. Technol. Adv. Mater.* 2017; 18(1):584-610). Interestingly, had this study considered fatigue, it is likely that fatigue properties could be substantially deteriorated in samples that did not show poor tensile properties (see, e.g., Gorsse S et al., *Sci. Technol. Adv. Mater.* 2017; 18(1):584-610).

While this study establishes a framework for the implementation of high-throughput testing techniques to investigate the tensile behavior of AM metal, future work could aim to implement this approach to further elucidate the complex relationship between processing parameters, AM microstructures, and mechanical properties. Here only three independent process parameters were considered, but there are an estimated 130 parameters that can be explored in process space for AM metals (see, e.g., Kamath C et al., "Density of additively-manufactured, 316L SS parts using laser powder-bed fusion at powers up to 400 W," *Int. J Adv. Manuf. Technol.* 2014; 74(1-4):65-78; and Yadroitsev I, Selective laser melting: direct manufacturing of 3D-objects by selective laser melting of metal powders, Lambert Academic Publishing (Saarbrucken, Germany), 2009, 266 pp.). Thus, the present invention also encompasses potential use of any of these parameters in any useful manner. As suggested by previous studies (see, e.g., Clymer D R et al., *J Mech. Design* 2017; 139(10):100907 (7 pp.); Beuth J et al., "Process mapping for qualification across multiple direct metal additive manufacturing processes," *Solid Freeform Fab. Proc.*, University of Texas at Austin (Austin, Tex.), 2013, pp. 655-665; and Irrinki H et al., *JOM* 2016; 68(3): 860-868), these parameters may have multi-dimensional relationships that can influence structure and properties. Due to the variability observed in these materials, high-throughput test methodologies such as those developed in this study provide an efficient pathway to understand these relationships with statistical significance.

In addition, beyond determinations of porosity and mechanical response, other characterizations may be useful in quantifying the resultant microstructure in these AM materials, such as surface roughness (see, e.g., Spierings A B et al., "Influence of the particle size distribution on surface quality and mechanical properties in AM steel parts," *Rapid Prototyp. J.* 2011; 17(3):195-202), geometric tolerances (see, e.g., Sames W J et al., *Int. Mater. Rev.* 2016; 61(5): 315-360), and residual stresses (see, e.g., Mercelis P et al., "Residual stresses in selective laser sintering and selective laser melting," *Rapid Prototyp. J.* 2006; 12(5):254-265; and Wu A S et al., "An experimental investigation into additive manufacturing-induced residual stresses in 316L stainless steel," Metallurg. *Mater. Trans. A* 2014; 45(13):6260-6270). Due to the extreme variation in microstructures found in AM materials, high-throughput microstructural characterization techniques must also be developed to understand the stochastic nature of these features. Developing these methods should allow for a more complete understanding of the process-structure-property relationships in these highly variable AM metals. Furthermore, the complex multi-dimensional nature of stochastic process-structure-property relationships may be more effectively explored by combining high-throughput data collection with machine learning methods that can interpret dependencies beyond human comprehension (see, e.g., Boyce B L et al., "Progress towards autonomous experimental systems for alloy development," *MRS Bull.* 2019; 44:273-280).

Although additively manufactured metals can show much variation in mechanical properties, high-throughput testing provides an efficient pathway to develop statistically meaningful understanding of these variations. In data presented herein, variation in yield stress and ductility are systematically related to printing parameters and microstructure. The L-PBF technique is demonstrated to be a robust process, wherein laser power and velocity can be varied substantially, up to 41% and 80%, respectively, from machine vendor recommended optimal parameters without significant degradation to strength or ductility. Beyond this robust regime, however, as-built materials may fail to conform to the print geometry or lose strength and ductility due to high levels of porosity. A secondary benefit of this systematic study has been the development of an efficient, high-throughput tensile methodology to empirically and statistically identify bounds in process-parameter space. Overall, development of high-throughput tensile testing proves to be an efficient way to survey the mechanical behavior of highly variable materials and extract their bounds of performance relative to imposed process parameters.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. An apparatus comprising:
   a sample cartridge comprising a first test sample and second test sample, wherein each test sample comprises a free end and an attached end;
   a cartridge holder configured to house the attached end of the first and second test samples;
   a grip assembly configured to grasp the free end of the first or second test sample; and
   a stage assembly configured to move the cartridge holder to a first position and a second position, wherein the first position provides the free end of the first test sample in proximity to the grip assembly and wherein the second position provides the free end of the second test sample in proximity to the grip assembly.

2. The apparatus of claim 1, wherein the sample cartridge comprises a base connected to each of the first test sample and the second test sample.

3. The apparatus of claim 2, wherein the base, the first test sample, and the second test sample comprises a monolithic, single structure.

4. The apparatus of claim 1, wherein the sample cartridge comprises a plurality of test samples, and wherein each test sample comprises a free end and an attached end.

5. The apparatus of claim 1, wherein the first test sample comprises an upper shoulder portion in proximity to the free end, a lower shoulder portion in proximity to the attached end, and a reduced section disposed between the upper and lower shoulder portions.

6. The apparatus of claim 5, wherein the upper shoulder portion and the lower shoulder portion comprises a wedge having a 45° angle.

7. The apparatus of claim 5, further comprising a notch disposed at the attached end, wherein the notch is configured to adapt to an alignment feature of the cartridge holder.

8. The apparatus of claim 1, wherein the grip assembly comprises a first jaw portion, a second jaw portion, and a recessed portion disposed between the first and second jaw portions; and wherein the recessed portion is configured to adapt to the free end of the first test sample.

9. The apparatus of claim 1, wherein the stage assembly is configured to translate horizontally from the first position to the second position.

10. The apparatus of claim 9, wherein the stage assembly is configured to translate vertically to apply a tensile stress between the free end and the attached end of the first test sample.

11. The apparatus of claim 10, wherein the stage assembly is configured to translate vertically to release the tensile stress applied to the first test sample, to translate horizontally to adapt to the free end of the second test sample, and to translate vertically to release the tensile stress applied to the second test sample.

12. The apparatus of claim 1, further comprising:
    a camera configured to image a section disposed between the free end and the attached end of the first test sample.

13. The apparatus of claim 12, wherein the camera is configured to image a first section disposed between the free end and the attached end of the first test sample at the first position, and wherein the camera is further configured to image a second section disposed between the free end and the attached end of the second test sample at the second position.

14. The apparatus of claim 12, further comprising:
    a processor coupled to the camera, wherein the processor is configured to receive one or more electronic detection signals from the camera, and wherein the processor is configured to generate a stress measurement based on the one or more detection signals.

15. The apparatus of claim 14, wherein the stress measurement is provided in real time.

16. The apparatus of claim 1, wherein the sample cartridge comprises a carrier configured to house the attached end of the first and second test samples.

17. The apparatus of claim 1, further comprising:
    a processor coupled to the stage assembly, wherein the processor is configured to generate a horizontal control signal and a vertical control signal to move the stage assembly.

18. A method of measuring a characteristic of a plurality of test samples, the method comprising:
    i. providing a sample cartridge disposed on a stage assembly, wherein the sample cartridge comprises a first test sample and second test sample, wherein each test sample comprises a free end and an attached end;
    ii. positioning a recessed portion of a grip assembly in proximity to the free end of the first test sample, wherein the grip assembly comprises a first jaw portion, a second jaw portion, and the recessed portion disposed between the first and second jaw portions;
    iii. moving the stage assembly to a first position to apply a tensile stress to a reduced portion of the first test sample;
    iv. imaging the reduced portion of the first test sample;
    v. moving the stage assembly to a second position to release the applied tensile stress to the first test sample;
    vi. moving the stage assembly to a third position that provides the free end of the second test sample in proximity to the recessed portion of the grip assembly; and
    vii. moving the stage assembly to a fourth position to apply a tensile stress to a portion of the second test sample.

19. The method of claim 18, wherein the imaging step further includes analyzing one or more images to provide a stress measurement.

20. The method of claim 18, further comprising, after step (vii):
    viii. imaging the reduced portion of the second test sample.

* * * * *